(12) United States Patent
Tago et al.

(10) Patent No.: US 10,977,313 B2
(45) Date of Patent: Apr. 13, 2021

(54) SEARCH METHOD, COMPUTER-READABLE RECORDING MEDIUM, AND SEARCH DEVICE

(71) Applicant: FUJITSU LIMITED, Kawasaki (JP)

(72) Inventors: Shinichiro Tago, Shinagawa (JP); Kenichi Kobayashi, Kawasaki (JP); Yoshinori Sakamoto, Kawasaki (JP); Nobuyuki Igata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 193 days.

(21) Appl. No.: 16/134,161

(22) Filed: Sep. 18, 2018

(65) Prior Publication Data
US 2019/0087509 A1  Mar. 21, 2019

(30) Foreign Application Priority Data
Sep. 19, 2017  (JP) .............................. JP2017-179396

(51) Int. Cl.
| | | |
|---|---|---|
| *G06N 20/00* | (2019.01) | |
| *G06F 16/903* | (2019.01) | |
| *G06N 5/02* | (2006.01) | |
| *G06N 3/04* | (2006.01) | |
| *G06F 16/901* | (2019.01) | |
| *G06N 3/08* | (2006.01) | |
| *G06N 3/10* | (2006.01) | |

(52) U.S. Cl.
CPC .... *G06F 16/90335* (2019.01); *G06F 16/9024* (2019.01); *G06N 3/0427* (2013.01); *G06N 3/0445* (2013.01); *G06N 3/084* (2013.01); *G06N 3/105* (2013.01); *G06N 5/022* (2013.01); *G06N 20/00* (2019.01); *G06N 3/0454* (2013.01); *G06N 3/0481* (2013.01)

(58) Field of Classification Search
CPC ............ G06F 16/9024; G06F 16/9033; G06N 3/0427; G06N 3/0445; G06N 3/084; G06N 3/105; G06N 5/022
USPC ................... 707/737, 999.003, E17.014, 769
See application file for complete search history.

(56) References Cited

U.S. PATENT DOCUMENTS

| | | | |
|---|---|---|---|
| 2007/0299835 A1* | 12/2007 | Takeuchi ............ | G06F 16/9024 |
| 2015/0046496 A1* | 2/2015 | Karmarkar .............. | G06F 3/013 707/798 |

OTHER PUBLICATIONS

Fujitsu Laboratories Ltd., "Fujitsu Technology to Elicit New Insights from Graph Data that Expresses Ties between People and Things," Kawasaki, Japan, Oct. 20, 2016 (8 pp.).

\* cited by examiner

*Primary Examiner* — Robert W Beausoliel, Jr.
*Assistant Examiner* — Pedro J Santos
(74) *Attorney, Agent, or Firm* — Staas & Halsey LLP

(57) ABSTRACT

A learning device sets each search range that is a part of a graph in which a plurality of nodes are connected by a plurality of edges, for each start node of one or more start nodes in the graph, on the basis of a set problem and relevance of an attribute of each of one or more nodes or edges connected to the each start node, generates an evaluation value of each of the one or more nodes and edges included in the each search range on the basis of a learning result by a learning model of the set problem, updates the one or more nodes and edges of the each search range on the basis of the evaluation value corresponding to the each search range and the relevance of the attribute corresponding to the each search range and the set problem, and performs a search.

9 Claims, 30 Drawing Sheets

FIG.4

| No | TYPE | ATTRIBUTE | RELEVANCE | STATIC EVALUATION VALUE | DYNAMIC EVALUATION VALUE |
|---|---|---|---|---|---|
| 1 | NODE | A COMPANY | EXCELLENT (EXCELLENT), AA (GRADE)··· | 1 | - |
| ... | ... | ... | ... | ... | ... |

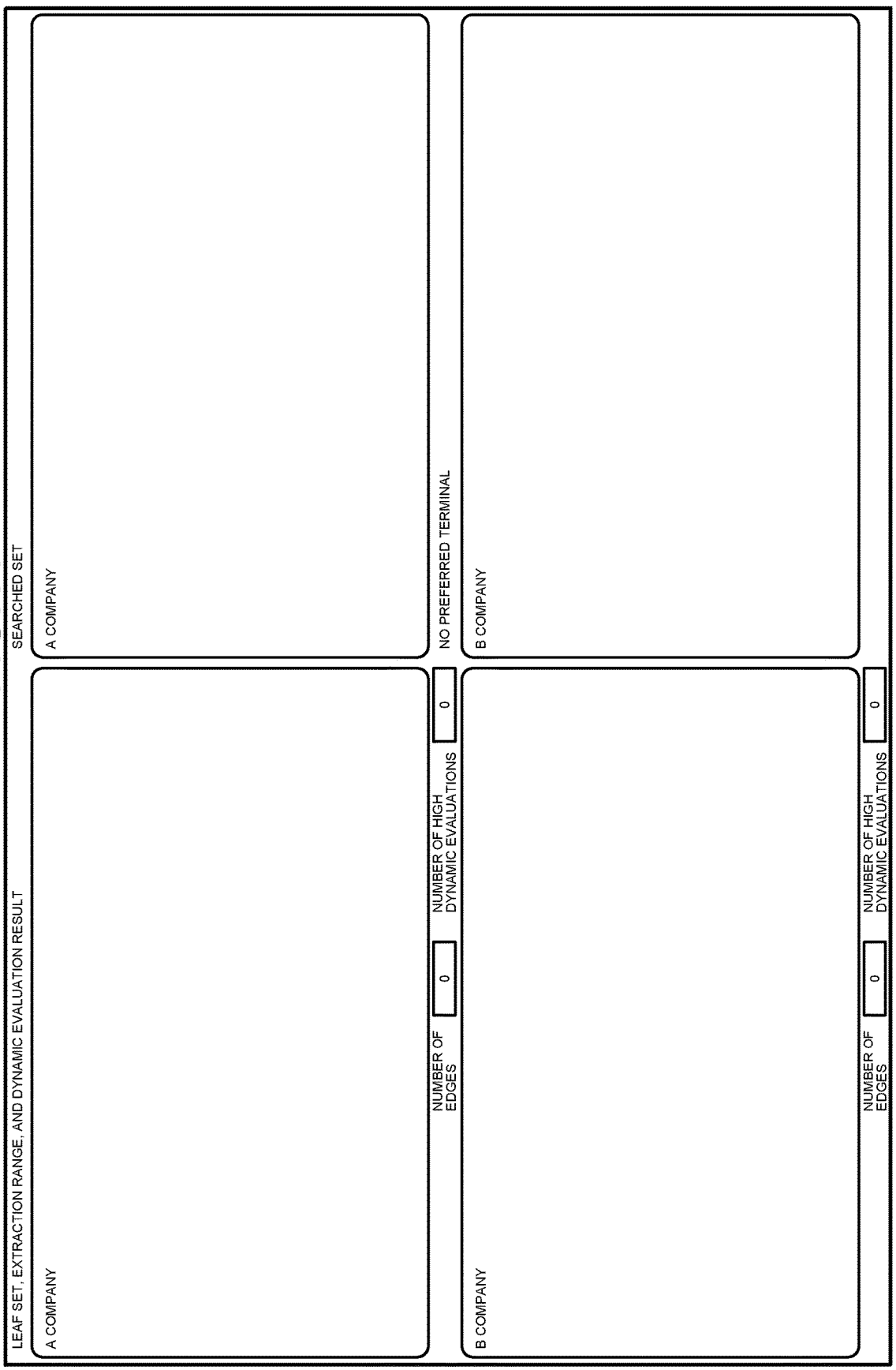

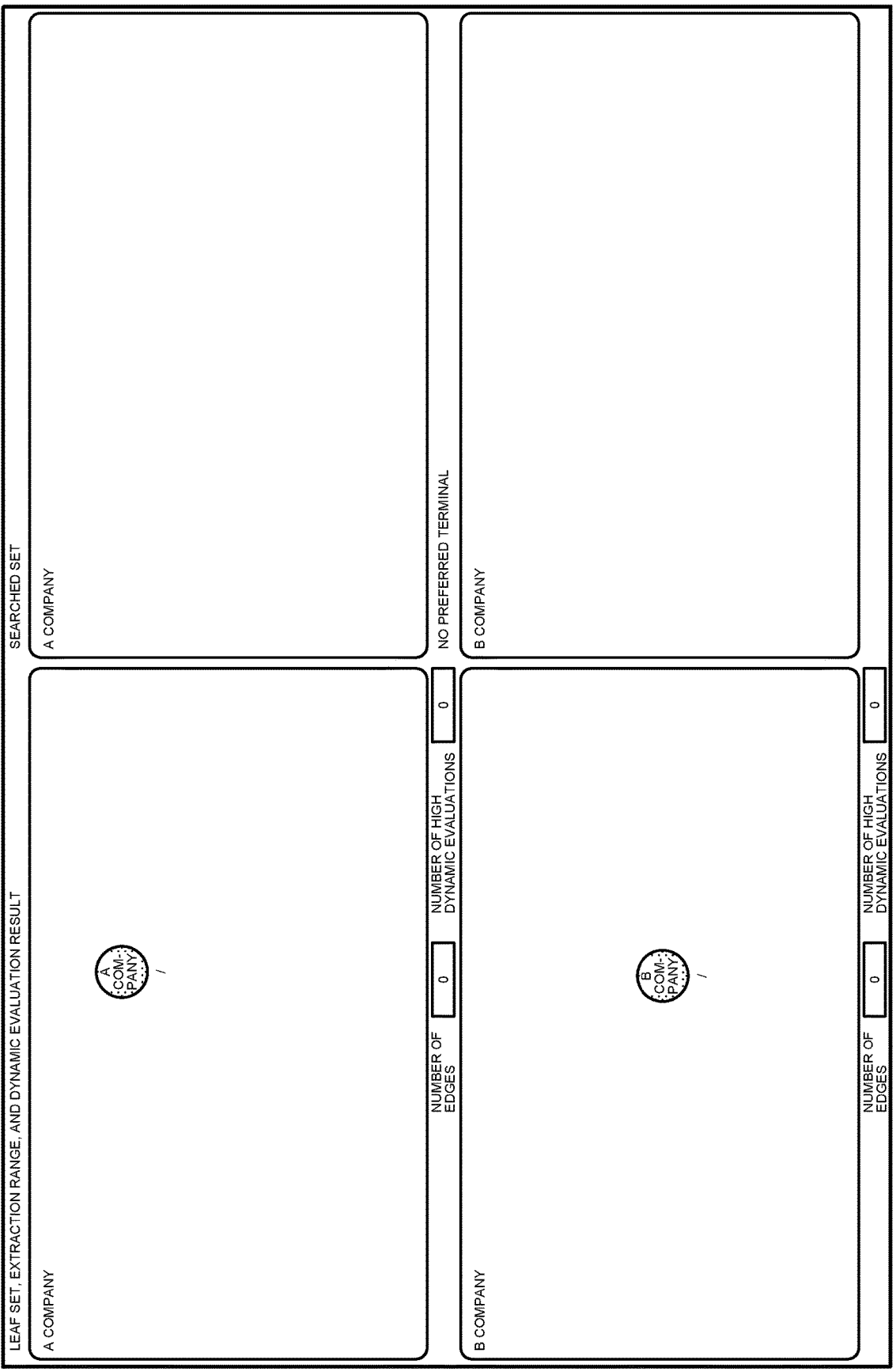

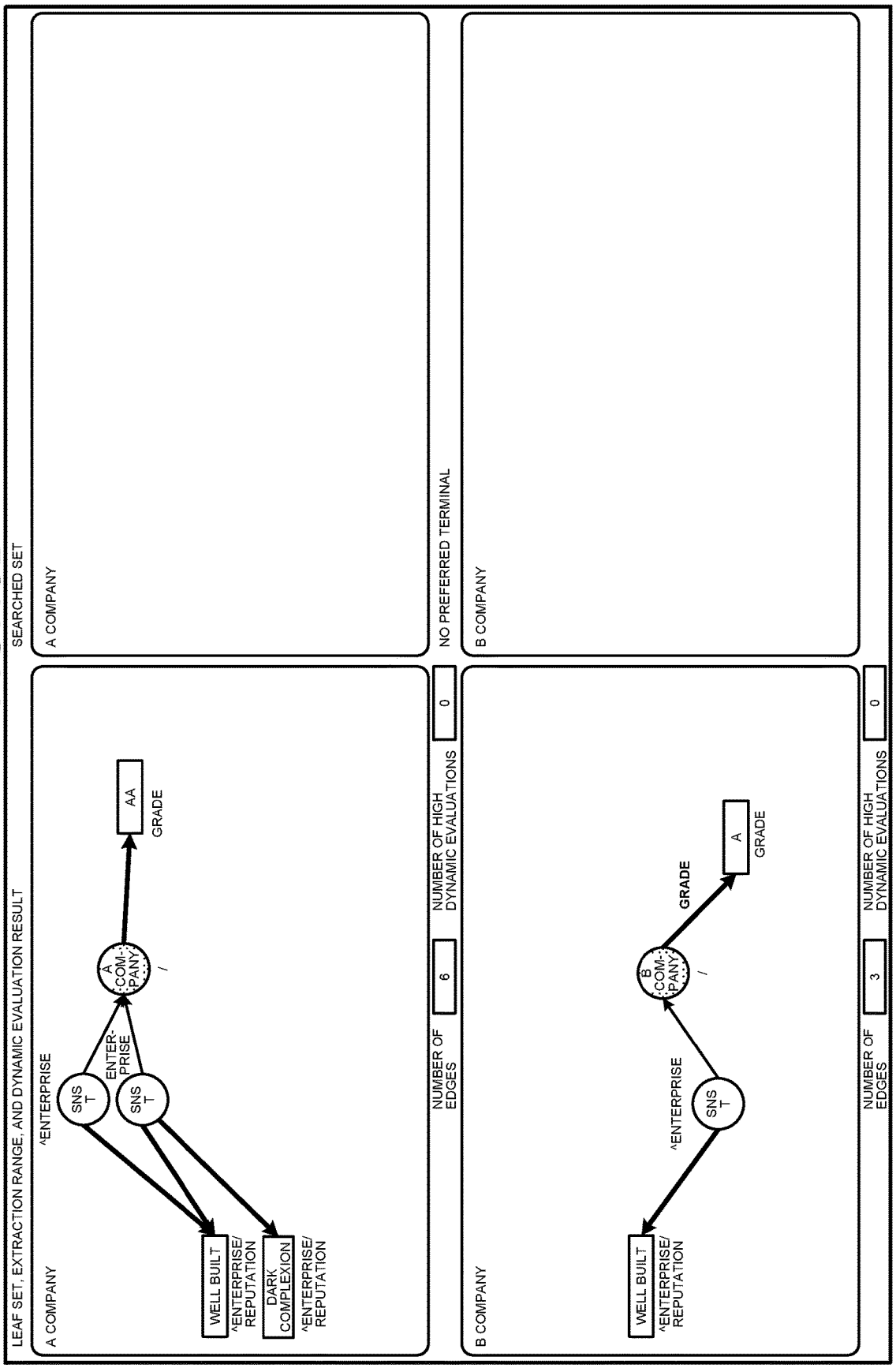

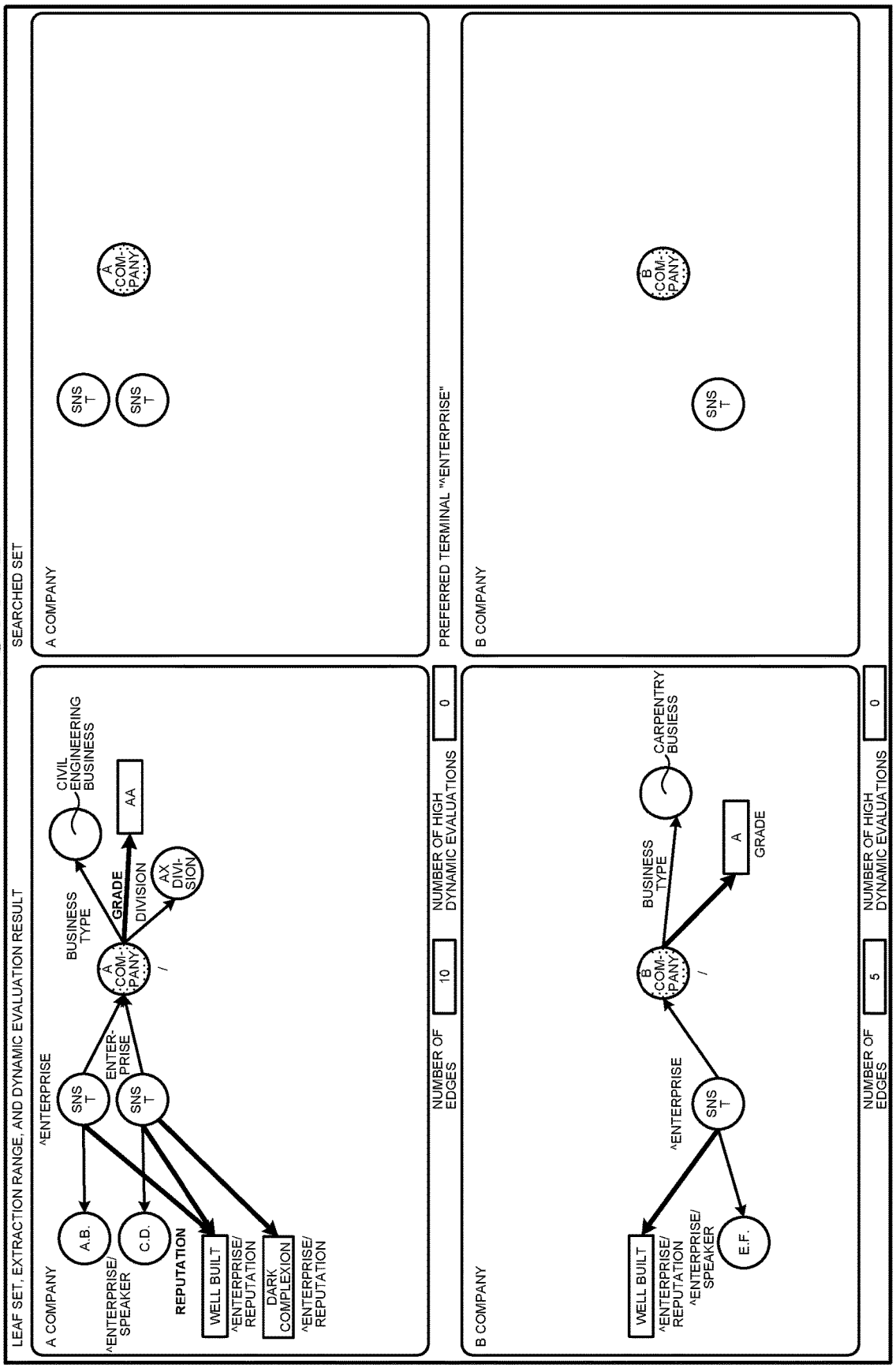

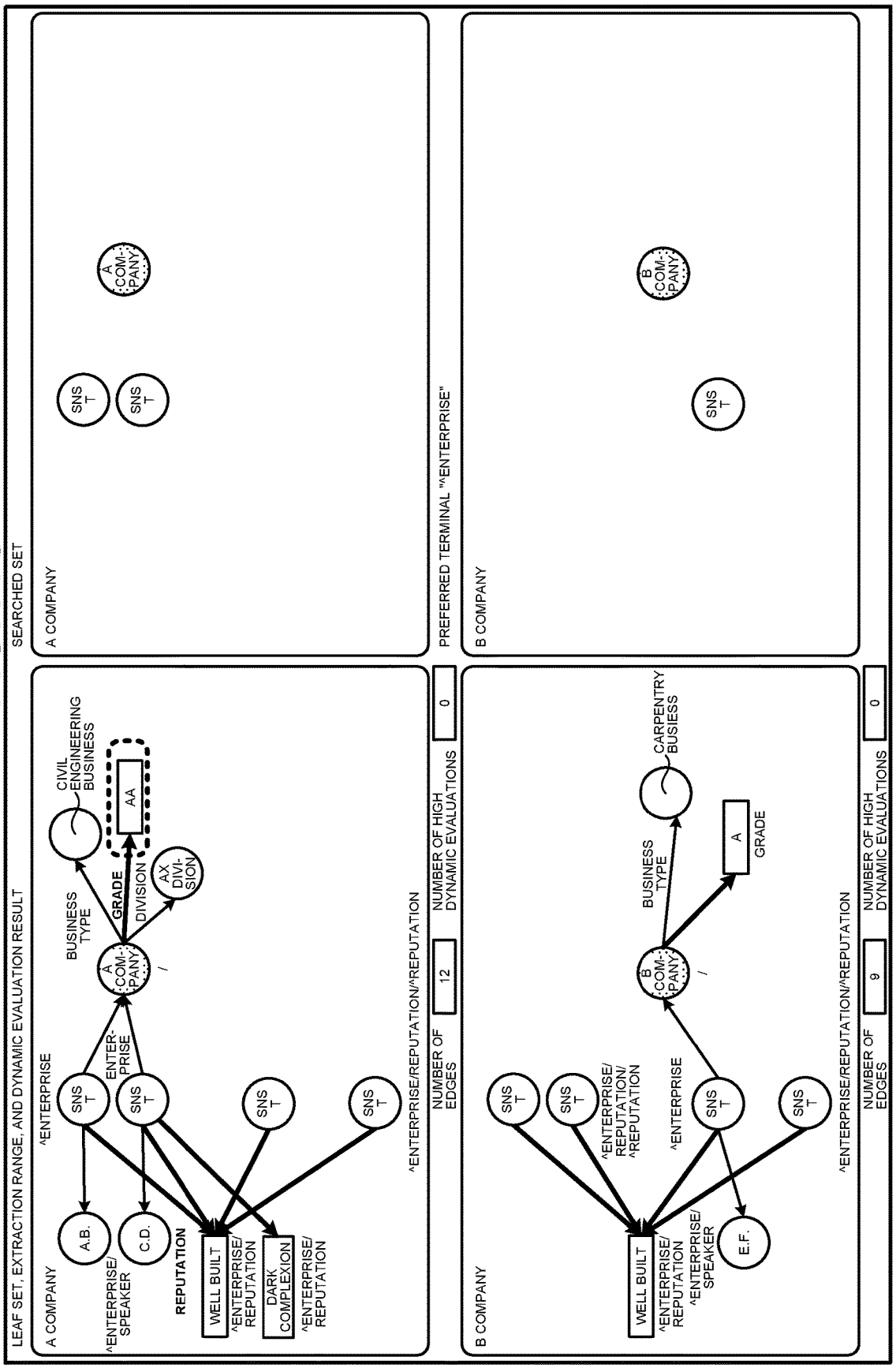

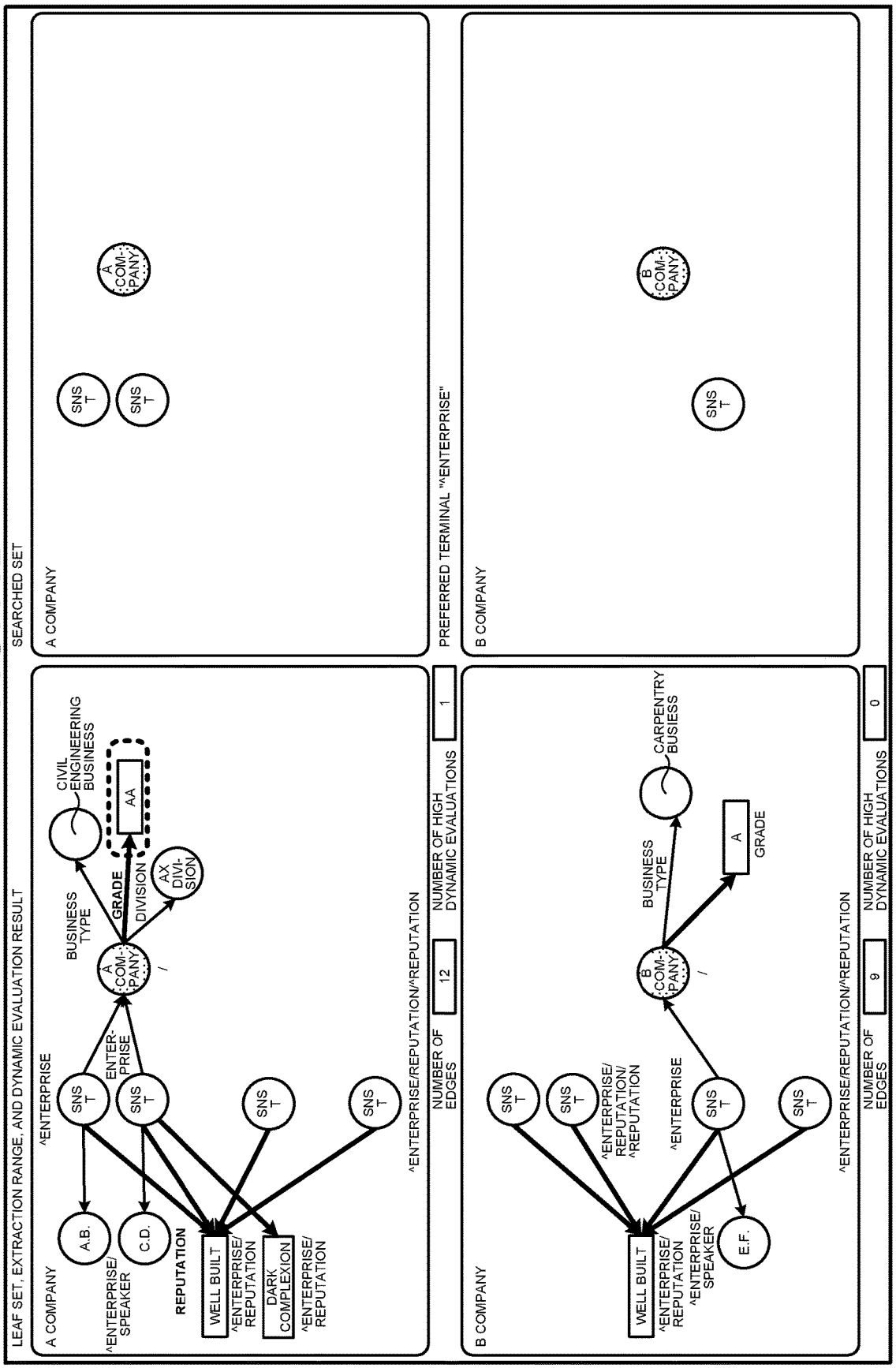

SEARCH METHOD, COMPUTER-READABLE RECORDING MEDIUM, AND SEARCH DEVICE

CROSS-REFERENCE TO RELATED APPLICATION

This application is based upon and claims the benefit of priority of the prior Japanese Patent Application No. 2017-179396, filed on Sep. 19, 2017, the entire contents of which are incorporated herein by reference.

FIELD

The embodiments discussed herein are related to a search method, a search program, and a search device.

BACKGROUND

Techniques of machine learning for data of a graph structure are known. Specifically, a technique of extracting a graph appropriate for a set problem given in a huge knowledge base, inputting the graph to a neural network, and causing learning of a learning model to be performed is known. Here, the set problem is to determine a classification set in a set which is set and refers to, for example, a problem such as "whether enterprise is excellent."

FIG. 22 is a diagram for describing learning of a graph structure. As illustrated in FIG. 22, in general, learning data of a plurality of graph structures is learned, and a part of the learning data which is strongly related to the set problem, that is, which is useful for estimation of determination is determined. FIG. 22 illustrates an example in which a part in which a grade of an enterprise is AA is found to be strongly related to determination of whether it is excellent.

Non-Patent Literature 1: "Deep Tensor: Eliciting New Insights from Graph Data that Express Relationships Between People and Things," [online], Oct. 20, 2016, Fujitsu, [searched on 2017 Sep. 1], Internet (URL: http://pr.fujitsu.com/jp/news/2016/10/20.html)

However, in the above technique, it is difficult to determine a range of learning data suitable for the set problem from a huge knowledge base having a plurality of nodes and a plurality of edges. For example, since resources such as a memory and a processor for learning are limited, it is difficult to set all nodes or edges as a learning target, but it is not realistic to decide artificially a node affecting the set problem.

In addition, it may be considered to delimit it by the number of hops from a starting point of the set problem, but a degree of influence of the node or the like having a small number of hops on the set problem is not necessarily large, and a degree of influence of the node or the like having a large number of hops on the set problem is not necessarily small. For this reason, there is a case in which a useful node or the like located at a position distant from the starting point is unable to be extracted, and the learning accuracy deteriorates accordingly.

SUMMARY

According to an aspect of an embodiment, a search method includes setting each search range that is a part of a graph in which a plurality of nodes are connected by a plurality of edges, for each start node of one or more start nodes in the graph, on the basis of a set problem and relevance of an attribute of each of one or more nodes or edges connected to the each start node, using a processor; generating, for the each search range, an evaluation value of each of the one or more nodes and edges included in the each search range on the basis of a learning result by a learning model of the set problem, using the processor; and updating, for the each search range, the one or more nodes and edges of the each search range on the basis of the evaluation value corresponding to the each search range and the relevance of the attribute corresponding to the each search range and the set problem and performing a search, using the processor.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 4 is a diagram illustrating an example of information stored in an attribute information DB;

FIG. 11 is a diagram for describing an initialized state of a memory at the time of search start;

FIG. 12 is a diagram for describing a state in which a pair of starting point and free path is added to a leaf set;

FIG. 13B is a diagram for describing a memory storage state at the time of search start;

FIG. 14B is a diagram for describing a memory storage state of a state 1;

FIG. 14C is a diagram for describing addition of an extraction range in a state 1;

FIG. 14D is a diagram illustrating a learning result in a state 1;

DESCRIPTION OF EMBODIMENTS

Preferred embodiments will be explained with reference to accompanying drawings. The present invention is not limited by the following embodiments. Further, respective embodiments can be appropriately combined within a range with no contradiction.

[a] First Embodiment

Overall Configuration Example

Figure 1:
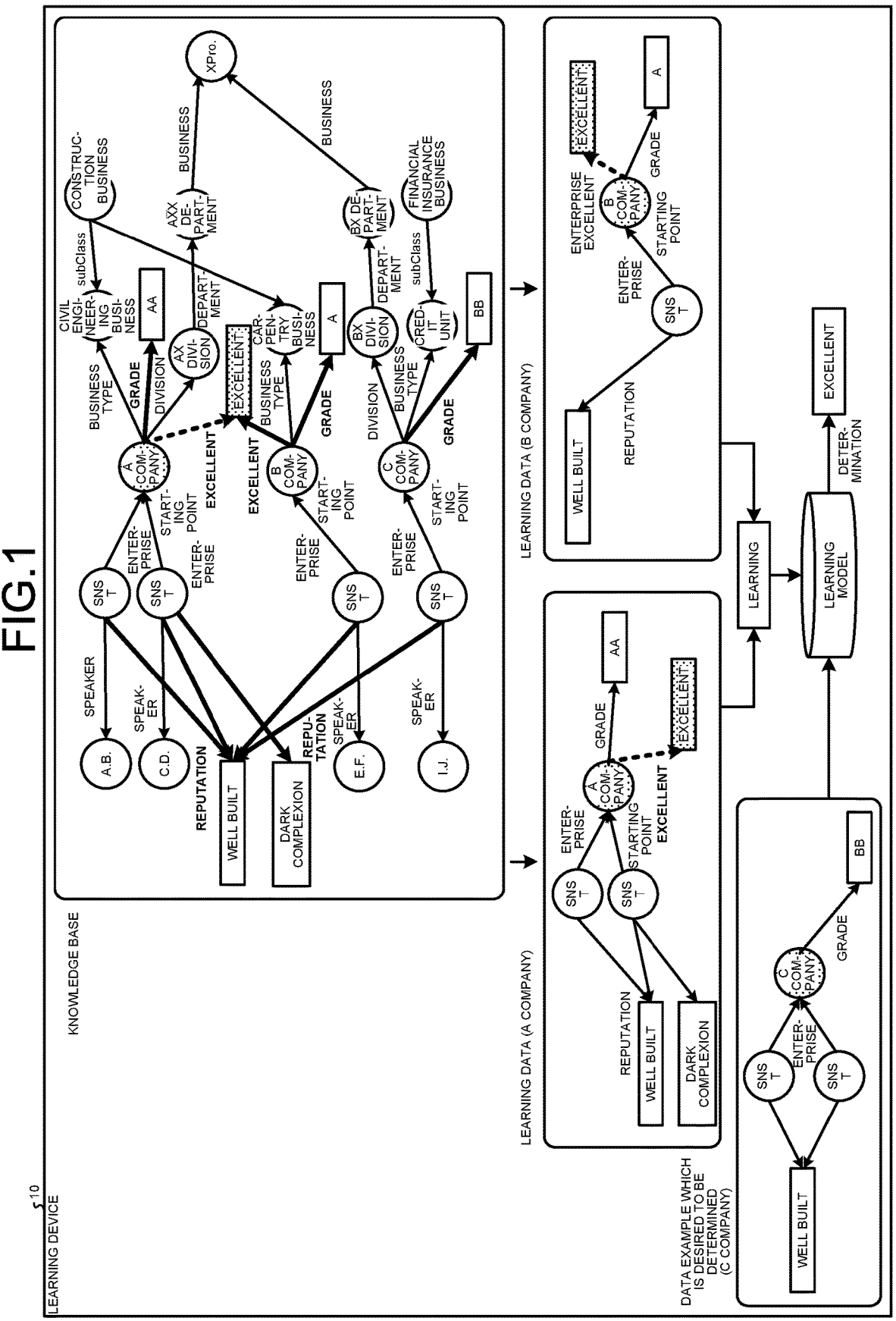
FIG. 1 is a diagram for describing an overall configuration example of learning according to a first embodiment.

FIG. 1 is a diagram for describing an overall configuration example of learning according to a first embodiment. As illustrated in FIG. 1, a learning device 10 according to the first embodiment is an example of a search device. The learning device 10 extracts a graph including learning data from a knowledge base, learns the graph, and thus generates a learning model. Then, the learning device 10 inputs data which is desired to be determined to the generated learning model and outputs a determination result.

Here, the knowledge base is obtained by analyzing information acquired from data within an enterprise, web data, social networking services (SNSs), or the like and expressing a relation between data using a graph. In the present embodiment, a knowledge base obtained by collecting and analyzing messages posted to SNSs is used as an example.

In the present embodiment, a learning model is generated by posing a problem such as an A company and a B company are "excellent" enterprises in the knowledge base illustrated in FIG. 1 and by extracting and learning a part with a strong relevance to the set problem.

Specifically, the learning device 10 extracts, from the knowledge base, the graph of a part with strong relevance with information indicating that the A company is an "excellent" enterprise as learning data (A company) and extracts the graph of a part with strong relevance with information indicating that the B company is an "excellent" enterprise as learning data (B company).

Here, it is important which range of a graph is extracted as the learning data among limited resources of the learning device 10. In other words, a range to be set as the learning data from the starting point of the set problem is important, and in a case in which the number of hops is small, loss of significant data that becomes far from the starting point occurs, whereas in a case in which the number of hops is large, a large number of unnecessary data is included, or resource exhaustion occurs.

In this regard, in order to extract suitable learning data in association with a given set problem using the knowledge base, the learning device 10 executes setting a starting point of extraction of a graph corresponding to the set problem, search of an optimal extraction range (extraction range) from the starting point within a resource restriction range, and determination by a learning model learned using learning data of a searched extraction range.

For example, the learning device 10 sets a search range which includes nodes and edges of a search target on the basis of relevance of an attribute of each of a plurality of nodes or edges connected to a start node selected from all graphs (i.e. "a graph" or "a whole graph") to which a plurality of nodes are connected and a set problem. Then, the learning device 10 generates an evaluation value of each of the nodes and edges included in the search range on the basis of a learning result by the learning model of the set problem of a plurality of graphs extracted from all the graphs in the search range. Thereafter, the learning device 10 updates the nodes and edges of the search target on the basis of the evaluation value of each of the nodes and edges included in the search range and the relevance of the attribute of each of the nodes and edges included in the search range and the set problem, and performs a search. As a result, the learning device 10 can determine the range of the learning data suitable for the problem setting from a huge knowledge base.

Then, the learning device 10 inputs the learning data obtained by such a search to the neural network as training data, performs learning, and generates a learning model. Thereafter, the learning device 10 inputs data of the determined C company to the learning model, and outputs a determination result indicating, for example, that the C company is an "excellent" enterprise. The number of learning data, the determination result, the set problem, the knowledge base, and the like are merely examples, and the present invention is not limited thereto. Here, an example in which the learning device 10 executes learning and determination will be described, but a learning device and a determining device can be implemented with separate enclosures.

Functional Structure

Figure 2:
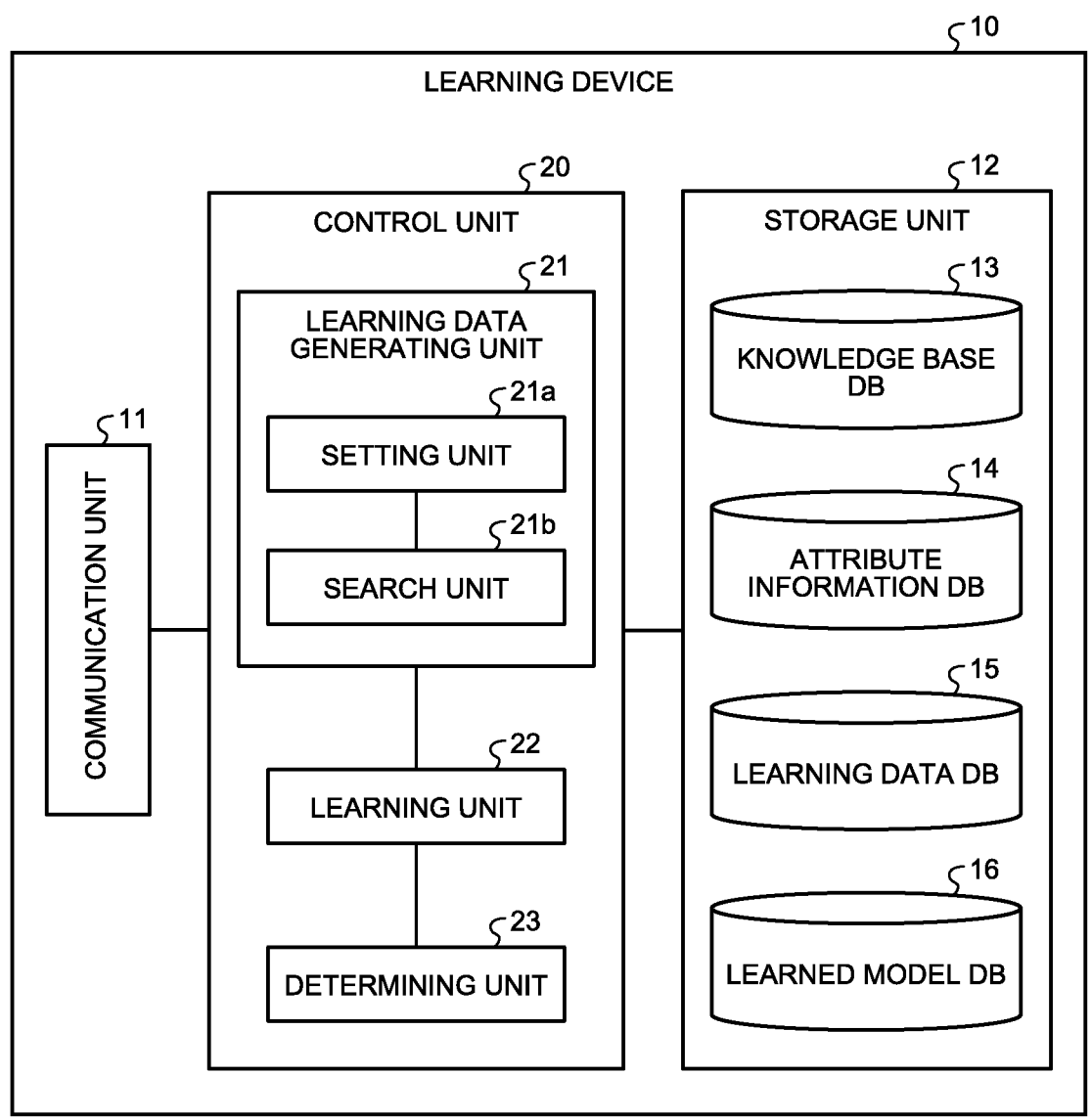
FIG. 2 is a functional block diagram illustrating a functional configuration of a learning device according to the first embodiment.

FIG. 2 is a functional block diagram illustrating a functional configuration of the learning device 10 according to the first embodiment. As illustrated in FIG. 2, the learning device 10 has a communication unit 11, a storage unit 12, and a control unit 20.

The communication unit 11 is a processing unit that controls communication between other devices, such as a communication interface card. For example, the communication unit 11 receives a learning instruction or determination target data from a terminal of an administrator or the like, and outputs a learning result or a determination result to a terminal of an administrator or the like or a display unit of a display or the like.

The storage unit 12 is an example of a storage device that stores a program and data, and is, for example, a memory or a hard disk. The storage unit 12 stores a knowledge base DB 13, an attribute information DB 14, a learning data DB 15, and a learned model DB 16.

Figure 3:
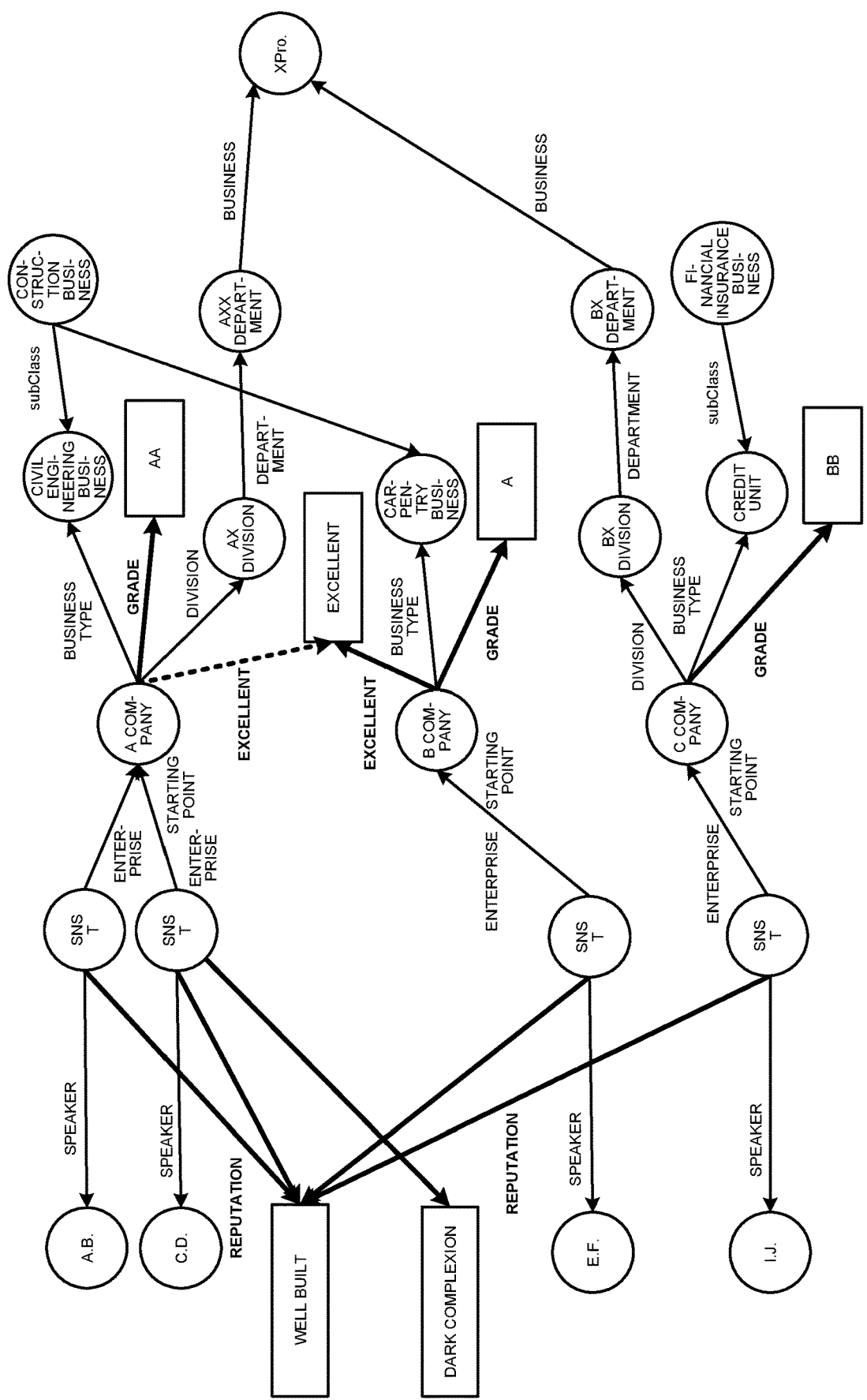
FIG. 3 is a diagram illustrating an example of information stored in a knowledge base DB.

The knowledge base DB 13 is a database that stores a knowledge base which is a learning data extraction source. FIG. 3 is a diagram illustrating an example of information stored in the knowledge base DB 13. The knowledge base illustrated in FIG. 3 is data of a graph structure indicating a relation between data obtained by analyzing messages posted on the SNS.

A character string in a circle in FIG. 3 is a node specifying a uniform resource identifier (URI) or the like, and a character string in a square is a node describing a numerical value or a character string directly and is referred to as a so-called literal or the like. An arrow in FIG. 3 is an edge indicating a relation between the nodes. Further, a thick arrow in FIG. 3 indicates an edge with a high static evaluation value to be described later.

For example, in the example of FIG. 3, a node "A,B" and a node "SNS T" are connected by an edge "speaker," and the node "SNS T" and a node "A company" are connected by an edge "enterprise." This relation indicates that "A" and "B" posted remarks on an "A company" which is an enterprise on SNS.

Further, a node "E,F" and a node "SNS T" are connected by an edge "speaker," the node "SNS T" and a node "B company" are connected by an edge "enterprise," the node "B company" and a node "excellent" are connected by an edge "excellent," the node "B company" and a node "carpentry business" are connected by an edge "business type," and the node "B company" and a node "A" are connected by an edge "grade." This relation indicates that "E" and "F" posted remarks on the "B company" which is an enterprise on SNS, the "B company" is an "excellent" enterprise, its business type is "carpentry business," and its grade is "A."

Returning to FIG. 2, the attribute information DB 14 is a database that stores information related to each node and each edge constituting the knowledge base. Specifically, the attribute information DB 14 stores additional information added to the nodes and the edges. FIG. 4 is a diagram illustrating an example of information stored in the attribute information DB 14. As illustrated in FIG. 4, the attribute information DB 14 stores "No., type, attribute, relevance, static evaluation value, and dynamic evaluation value" in association with one another.

"No." stored herein is information identifying a record of the attribute information DB 14. The "type" is information indicating whether it is a node or an edge. The "attribute" is a label attached to a node or an edge. The "relevance" is information specifying relevance between the attribute and another attribute and indicates each node connected with the attribute, an edge connecting the attribute with another attribute, a connection relation, and the like, and is indicated by, for example, a "node (edge)" or the like. The "static evaluation value" is a predetermined evaluation value, and is an index using, for example, proximity of vocabularies on an ontology. The "dynamic evaluation value" is an evaluation value calculated by machine learning executed in a search process for a learning graph, and is updated each time machine learning is performed. For example, the "dynamic evaluation value" indicates how much the nodes and the edges are involved in determining a classification of a target graph, and in normal machine learning, features selection is performed by feature ranking of feature quantity, and an index used for feature ranking can be employed.

In the example of FIG. 4, the node "A company" is connected with the node "excellent" and the edge "excellent" by the node "AA" and the edge "grade," "1" is set as the static evaluation value, and the dynamic evaluation value is not set. The connection relation can also be associated with a direction of the edge or the like. Further, values which are calculated or set can be set as the static evaluation value and the dynamic evaluation value, but for the sake of simplification of description, an example in which "1" is set in a case in which it has a value equal to or larger than a threshold value, and "0" is set in a case in which it has a value less than the threshold value has been described.

Figure 5:
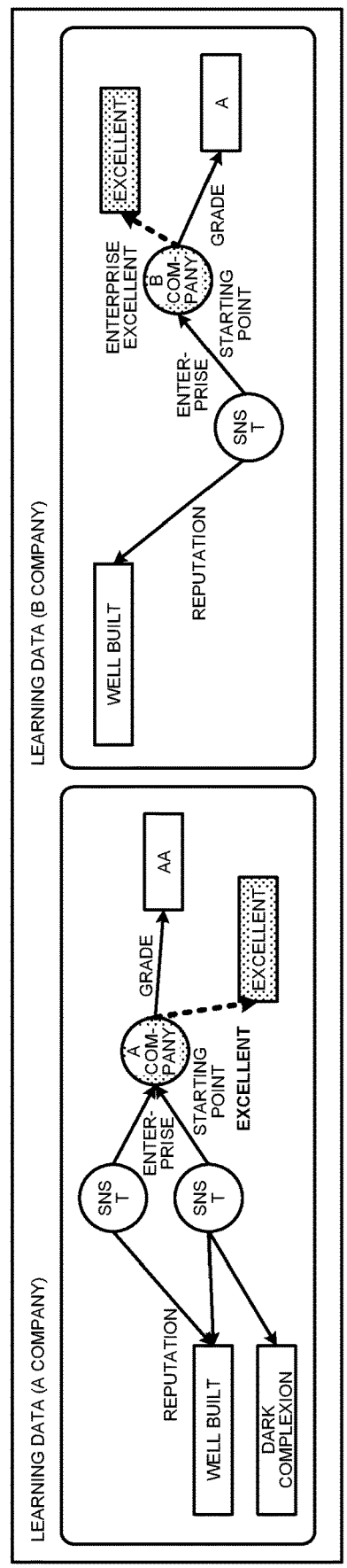
FIG. 5 is a diagram illustrating an example of information stored in a learning data DB.

The learning data DB 15 is a database that stores the learning data generated by the control unit 20 to be described later, that is, the learning data in which an appropriate node and edge are extracted for the set problem. FIG. 5 is a diagram illustrating an example of information stored in the learning data DB 15. As illustrated in FIG. 5, the learning data DB 15 stores the learning data (A company) and the learning data (B company). Learning data (A company) is data of a graph structure including nodes "A company, SNS T, SNS T, well built, dark complexion, AA, and excellent." Further, the learning data (B company) is data of a graph structure including nodes "B company, SNS T, well built, A, and excellent."

The learned model DB 16 is a database that stores a learning model which is a result of learning using the learning data stored in the learning data DB 15. For example, the learned model DB 16 stores various kinds of weighting coefficients of the neural network and the like.

The control unit 20 is a processing unit that controls the entire learning device 10, and is, for example, a processor. The control unit 20 includes a learning data generating unit 21, a learning unit 22, and a determining unit 23. The learning data generating unit 21, the learning unit 22, and the determining unit 23 are an example of an electronic circuit such as a processor or an example of a process executed by the processor.

The learning data generating unit 21 includes a setting unit 21a and a search unit 21b, and is a process unit that executes searching for the learning data optimal for learning from the knowledge data and generating the learning data. Further, the learning data generating unit 21 searches the extraction ranges within a range of determined resources so that a predetermined number or more of nodes with a high dynamic evaluation number are included in consideration of restriction of resources such as a memory.

The setting unit 21a is a process unit that executes setting of the starting point of the extraction of the graph corresponding to problem setting and a path to a solution. Specifically, the setting unit 21a sets a problem, a starting point, a solution, a path to a solution, and the like in accordance with an instruction from an administrator or the like. In other words, the setting unit 21a converts the set problem to a graph problem. Specifically, a set of starting points of input graphs and a path to the solution are set. A value of a part having no value before the path is tracked from the starting point is estimated, and in a case in which there is a value before the path is tracked, it is used as one sample of learning data.

For example, the setting unit 21a sets "A company, excellent" and "B company, excellent" in the knowledge base illustrated in FIG. 3 as "starting point, solution." Further, the setting unit 21a sets a problem of "A company→excellent" by setting a path from the node "A company" which is the starting point to the node "excellent" which is the solution. Similarly, the setting unit 21a sets a problem of "B company→excellent" by setting a path from the node "B company" which is the starting point to the node "excellent" which is the solution.

The search unit 21b is a process unit that searches the extraction range of the graph appropriate for learning of the relation for the set problem set by the setting unit 21a. Specifically, the search unit 21b searches an optimal range of learning data to be input for learning. If the range of the graph is small, information for determining the solution is small, and thus the determination accuracy deteriorates. It is desirable to increase the range of the graph in order to improve the accuracy, but since there is a restriction of resource, the range of the graph is unable to be largely increased. In other words, the search unit 21b searches an optimal graph range so that information with a high determination accuracy falls within the learning data extraction range while suppressing the graph size.

For example, the search unit 21b searches the graph extraction range by arbitrarily combining (1) a priority extraction process, (2) a scaling process, (3) a preferred terminal setting process, and (4) a deletion delay process. Here, each process will be described in detail.

(1) Priority Extraction Process

Figure 6:
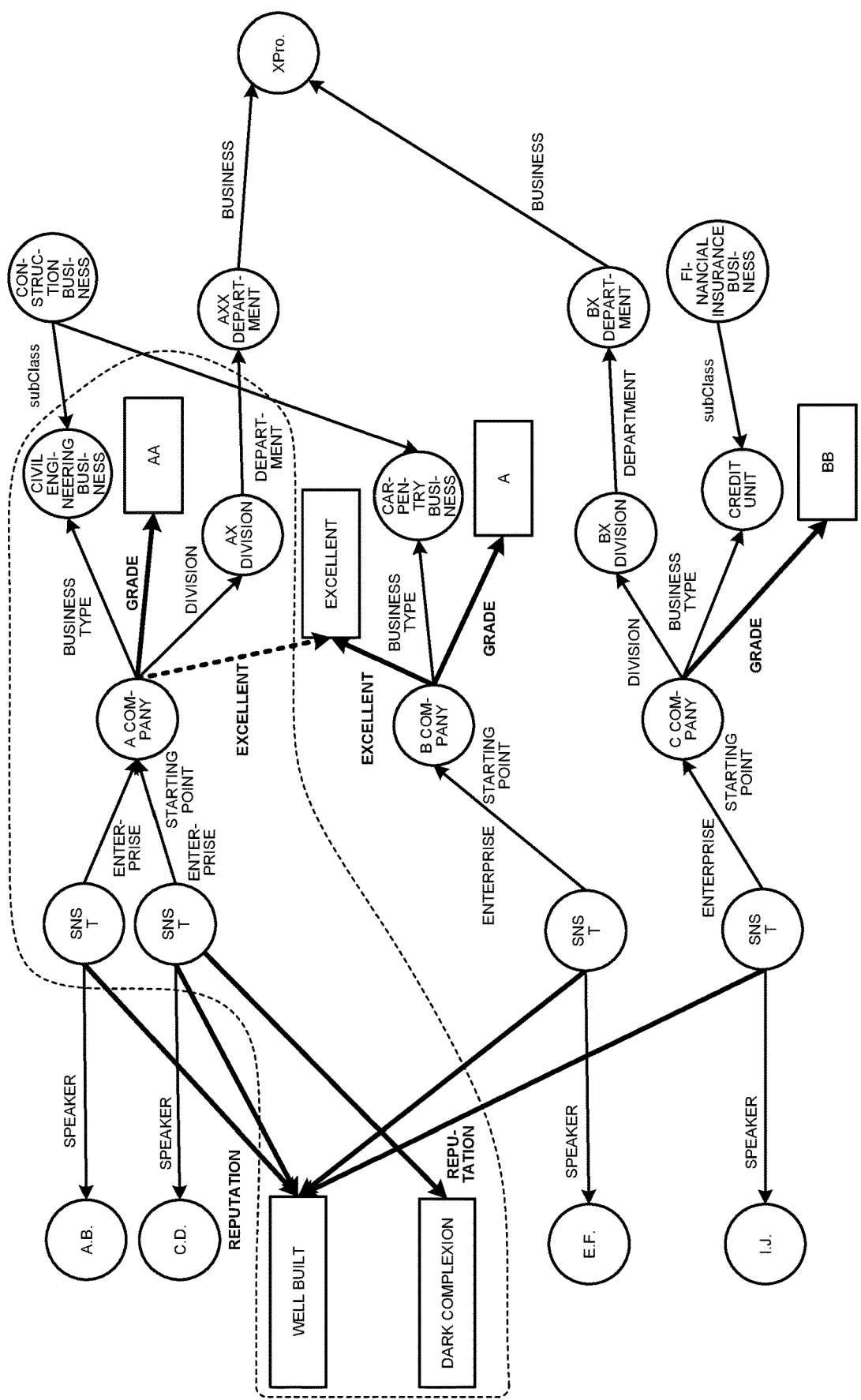
FIG. 6 is a diagram for describing an extraction process.

The priority extraction process is a process in which, when an attribute with a high static evaluation value is searched, the node or the edge is included in the extraction range with priority. FIG. 6 is a diagram for describing the extraction process. In FIG. 6, a search for the learning data of the A company is described as an example, but a similar process can be applied to the B company.

As illustrated in FIG. 6, the search unit 21b includes a node or an edge with a high static evaluation value among the nodes and edges within several hops from the starting point in the extraction range. For example, the search unit 21b includes all nodes and all edges positioned at one hop from the starting point in the extraction range, and includes only an edge with a high static evaluation value and a node connected to the edge among the nodes and the edges positioned at two hops from the starting point in the extraction range.

In the example of FIG. 6, the search unit 21b includes the edges "business type, grade, division, and ˆ enterprise" positioned at one hop from the starting point "A company" in the extraction range, and includes the nodes "SNS T," "civil engineering business," "AA," and "AX division" positioned at one hope from the starting point "A company" in the extraction range. The node "excellent" is a solution and thus not included in the extraction range, and the edge "excellent" is a path to the solution and thus also not included in the extraction range. In the present embodiment, a reverse path tracing a direction of an arrow is indicated by "ˆ." For example, "ˆ enterprise" indicates an inverse path of the edge "enterprise."

Then, the search unit 21b includes "reputation" with a high static evaluation value among the edges positioned at two hops from the starting point "A company" in the extraction range, and includes the nodes "well built" and "dark complexion" which are leaves of the edge "reputation" in the extraction range. As a result, the search unit 21b can include a range indicated by a dotted line of FIG. 6 in the extraction range.

(2) Scaling Process

Figure 7:
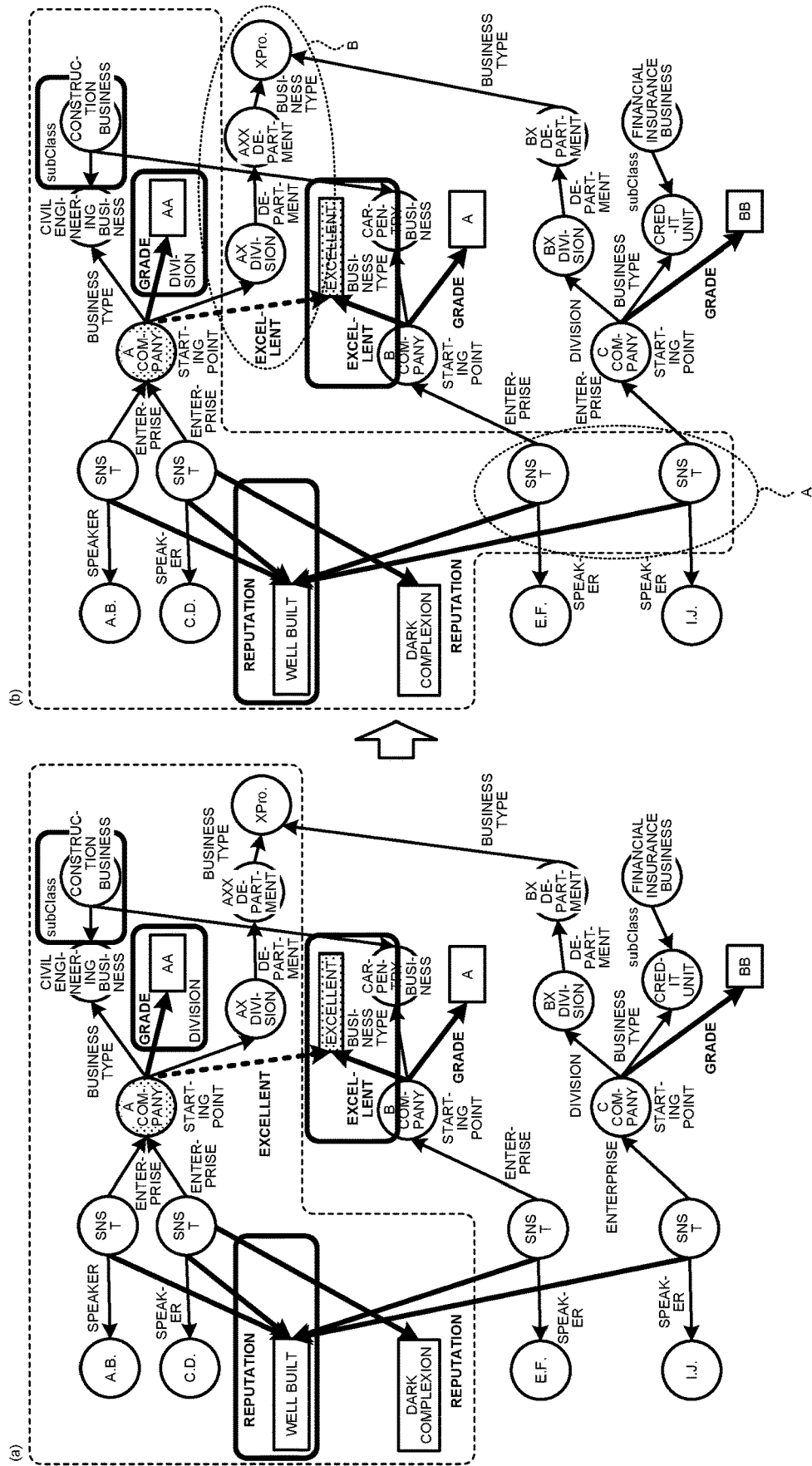
FIG. 7 is a diagram for describing a scaling process.

The scaling process is a process of deciding a part of the extraction range to be scaled up and a part of the extraction range to be scaled down using the evaluation values of the neighboring node and edge for a terminal of the extraction range so that an attribute with a high static evaluation value or a high dynamic evaluation value is included in the extraction range. FIG. 7 is a diagram for describing the scaling process. In FIG. 7, a search of the learning data of the A company will be described as an example, but a similar process can be applied to the B company.

(a) of FIG. 7 is a diagram illustrating an extraction range searched by the above processes (1) to (4) or the learning process at the time of search. In this state, since the static evaluation value of the edge "reputation" connecting the node "well built" and the node "SNS T" is high, the search unit 21b includes each node "SNS T" which is a leaf of the edge "reputation" in the extraction range. Further, since both of the static evaluation value and the dynamic evaluation value of the node "AX division" in the extraction range are low, the search unit 21b excludes the node "AX division" and nodes and edges subsequent thereto from the extraction range.

Therefore, as illustrated in (b) of FIG. 7, the search unit 21b newly adds a part of a region A from the state of (a) of FIG. 7 and changes a part of a region B to the deleted extraction range. As a result, the search unit 21b can preferentially include an edge which is somewhat far in distance but high in the static evaluation value in the extraction range. Further, the search unit 21b can preferentially leave a node or an edge with a high static evaluation value or a high dynamic evaluation value in the extraction range when the extraction range is scaled down.

(3) Preferred Terminal Setting Process

The preferred terminal setting process is a process of deciding a terminal in the extraction range which is not a deletion target so that among nodes simply decided as a deletion target by the static evaluation value or the dynamic evaluation value, nodes corresponding to one side are left in a certain range without being deleted in order to find a set associated with the set problem complexly. In other words, in the preferred terminal setting process, in normal circumstances, nodes deleted by the process of (1), (2), or the like are temporarily excluded from the deletion target until a relation with another node or edge is determined. In the present embodiment, the terminal in the extraction range which is not the deletion target is also referred as a "preferred terminal."

Figure 8:
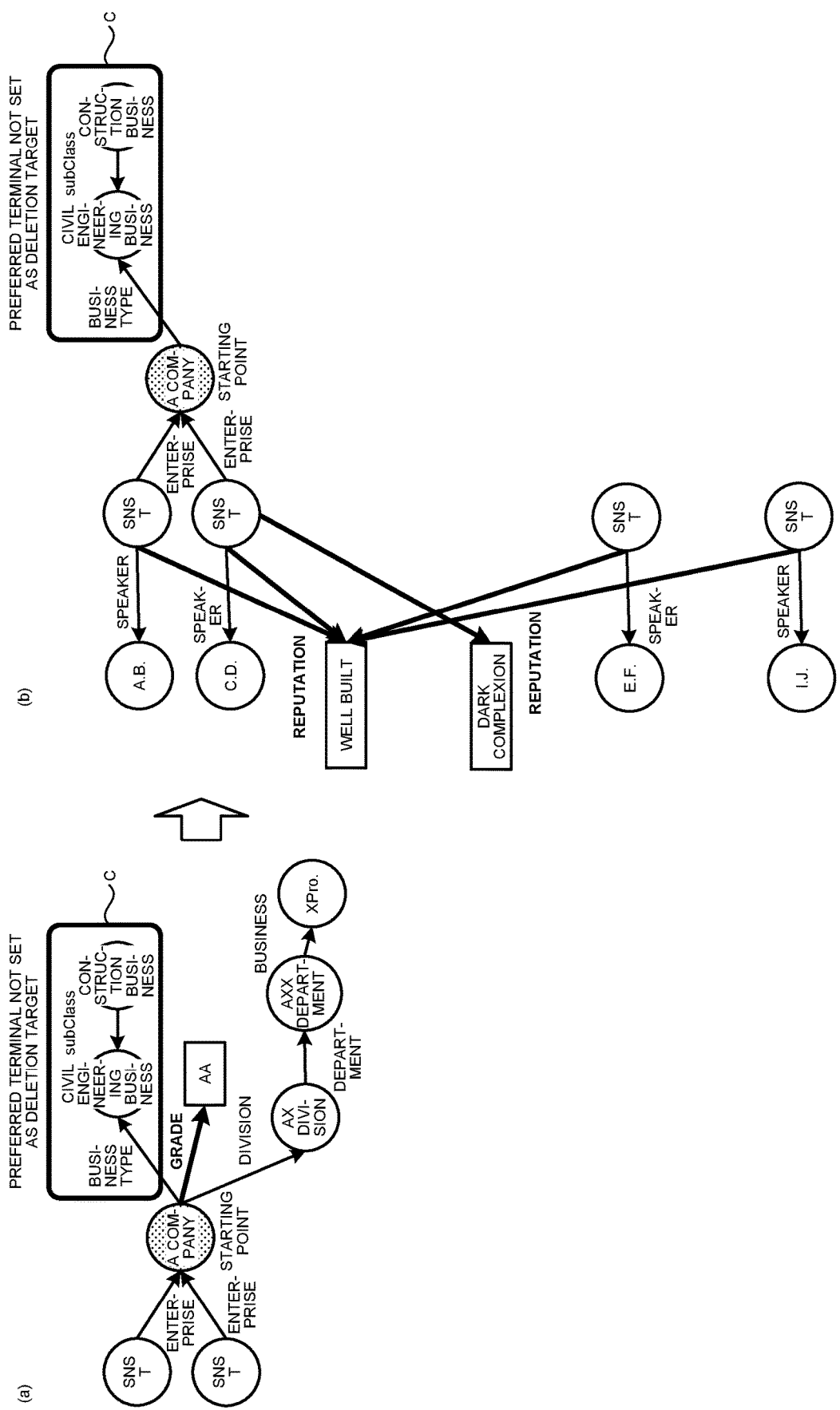
FIG. 8 is a diagram for describing a preferred terminal setting process.

FIG. 8 is a diagram for describing the preferred terminal setting process. In a state of (a) of FIG. 8, the search unit 21b excludes a region C including a node "civil engineering business" and a node "construction business" related to an edge "business type" out of the two nodes connected from a node "A company" from the deletion target by setting the region C as the "preferred terminal, and then searches a node "SNS T" side as illustrated in (b) of FIG. 8.

Accordingly, it is possible to search for a node which is a deletion target node since each evaluation value is low but high in a relation with the region C and high in the dynamic evaluation value by learning when the node "SNS T" side is searched.

Therefore, since a certain range remains without being replaced, it is possible to investigate whether or not a combination of the range and another range to be replaced sequentially is associated with the set problem. Further, it is possible to investigate whether a search is performed on up to every corner comprehensively or overall roughly by adjusting a timing to change a terminal which is not deleted.

If there are few terminals which are not deleted, the number of patterns in which others are not deleted increases, but other ranges can be deepened, and if there are many terminals which are not deleted, other patterns are reduced, but other ranges are unable to be deepened due to resource restriction. Therefore, by adjusting the number of terminals which are not deleted, it is possible to adjust whether to search other ranges deeply or to decrease the number of trials.

(4) Deletion Delay Process

The deletion delay process is a process of delaying deletion of a node in accordance with a height of each evaluation value in order to find a set associated with the set problem complexly even in the case of nodes which are decided to be simply deleted together by each evaluation value and setting a delay condition corresponding to a total evaluation value of a node so that many combinations can be tried.

Specifically, the search unit 21b determines whether or not the total evaluation value decided depending on whether the evaluation value is high or low satisfies a preset delay condition, and determines whether or not deletion of the corresponding node is delayed. For example, the search unit 21b calculates, as the total evaluation value, "the number of hops−2" when the dynamic evaluation value is high, calculates "the number of hops−8" when the static evaluation value is high, calculates "the number of hops−10" when all the respective evaluation values are high, and calculates "the number of hops−0" when all the respective evaluation values are low. Then, the search unit 21b delays the deletion of the corresponding node when the delay condition "total evaluation value determination value (4−the number of extended hops)" is satisfied but deletes the node when the delay condition is not satisfied. The number of extended hops indicates the number of hops of the path from the starting point of the node which is included in the extraction range immediately before.

Figure 9:
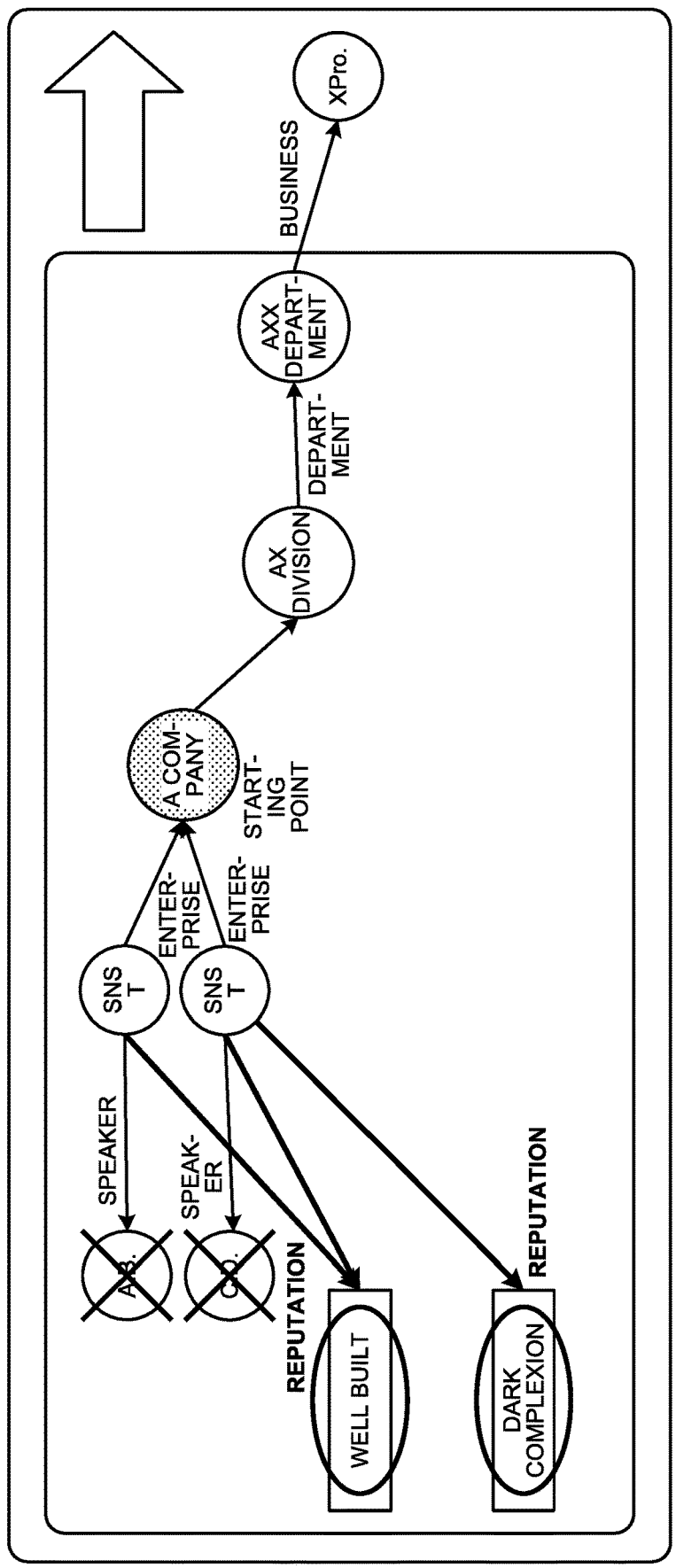
FIG. 9 is a diagram for describing a deletion delay process.

FIG. 9 is a diagram for describing the deletion delay process. As illustrated in FIG. 9, in a case in which deleting a node "AXX department" of a second hop from the starting point "A company" is deleted, the search unit 21b determines whether or not the deletion of the node "AXX department" is delayed. In other words, the search unit 21b determines whether or not the node "X Pro." positioned at a third hop is included in the search range.

For example, when all the respective evaluation values are low, since the total evaluation value "the number of two hops−0=2" is larger than the determination value "4−the number of three hops=1," and the delay condition is not satisfied, the search unit 21b executes another search without including the node "X Pro." positioned at the third hop in the search range. On the other hand, when all the respective evaluation values are high, since the total evaluation value "the number of two hops−2=0" is smaller than the determination value "4−the number of three hops=1," and the delay condition is satisfied, the search unit 21b includes the node "X Pro." positioned at the third hop in the search range, and then executes next search. Accordingly, since the deletion of some nodes is delayed, it is possible to increase a possibility of complex conditions being found.

Returning to FIG. 2, the learning unit 22 is a process unit that inputs the learning data stored in the learning data DB 15 to the neural network and performs learning. Specifically, the learning unit 22 constructs a graph corresponding to the range searched and extracted by the learning data generating unit 21 and performs learning using a learning technique by which the classification of the graph can be learned. For example, the learning unit 22 reads learning data A from the learning data DB 15, inputs the learning data A to the neural network, and obtains an output. Then, the learning unit 22 performs learning so that an error between an output value and a label "excellent" is decreased.

Thereafter, in a case in which a predetermined number of learnings are executed, when the error is smaller than a predetermined value, the learning unit 22 ends the learning, and stores various kinds of parameters in the learned model DB 16. As the neural network, various kinds of neural networks such as a recurrent neural network (RNN) can be used. Further, various techniques such as an error back propagation technique can be employed as the learning method.

The determining unit 23 is a process unit that determines data of a determination target by using the learning result. Specifically, the determining unit 23 estimates one whose solution is unknown using the learning model obtained by performing the learning by the learning unit 22. In other words, the determining unit 23 searches for the starting point in response to the input, constructs the graph of the extraction range set by the learning data generating unit 21 from the starting point, determines the graph by the learning model, and obtains an estimation value.

For example, the determining unit 23 reads various kinds of parameters from the learned model DB 16 and constructs a neural network in which various kinds of parameters are set. Then, the determining unit 23 extracts the graph of the range set by the learning data generating unit 21 from the data of the determination target, inputs the graph to the neural network, and acquires the determination result. Thereafter, the determining unit 23 outputs the determination result to the display, transmits the determination result to the management terminal, or stores the determination result in the storage unit 12.

Process Flow

Figure 10A:
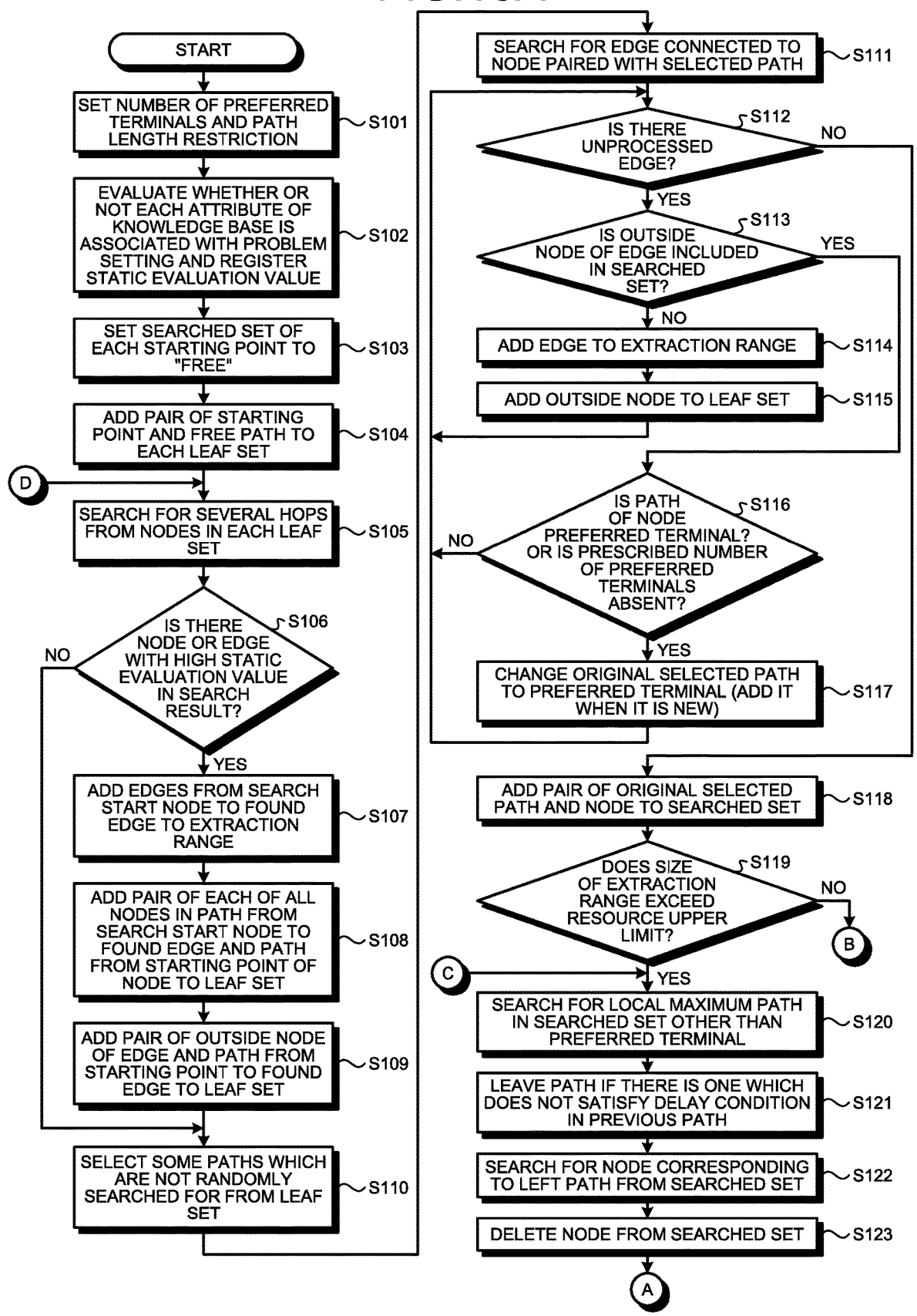
FIG. 10A is a flowchart illustrating a flow of a learning data generation process.
Figure 10B:
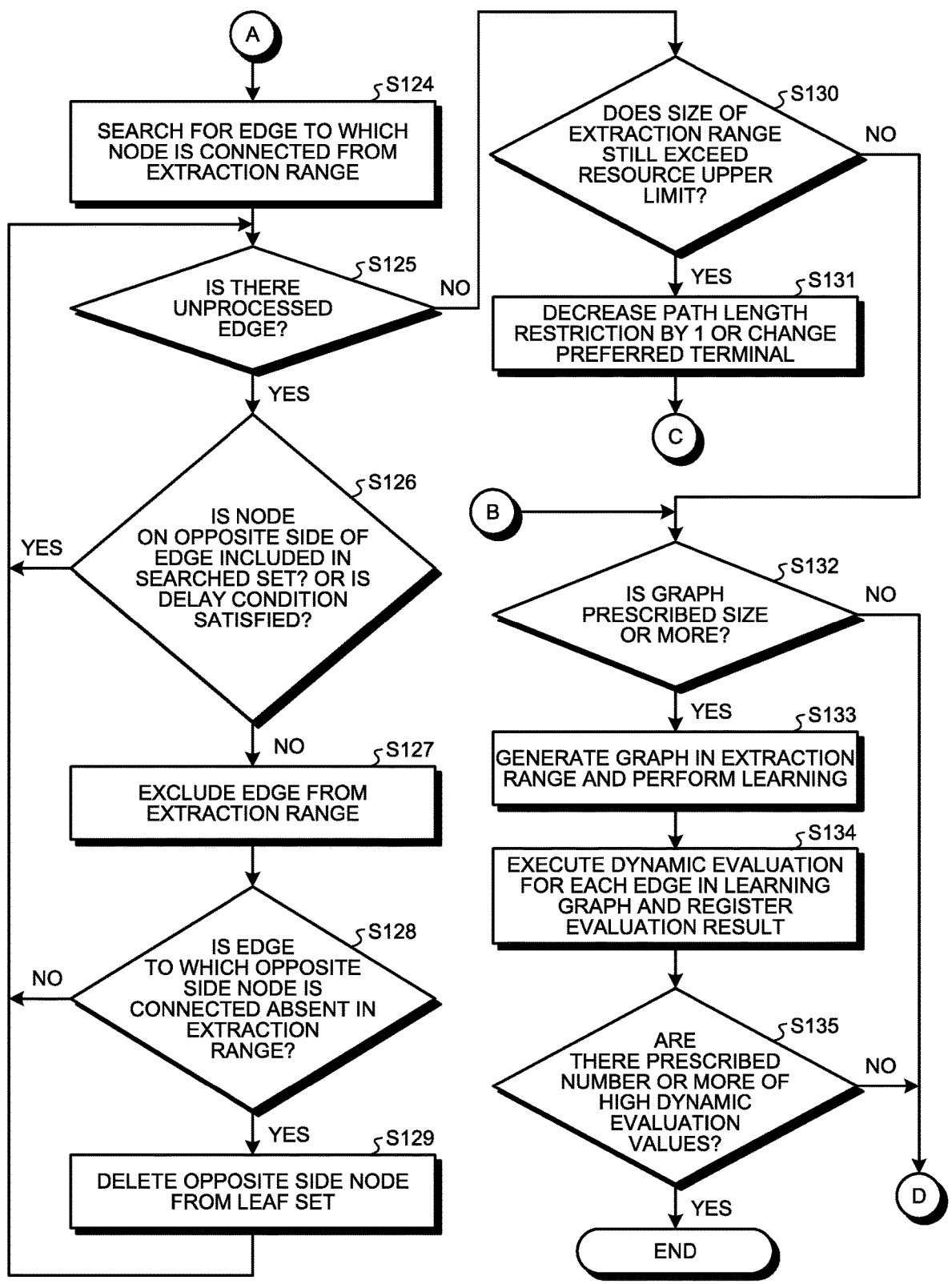
FIG. 10B is a flowchart illustrating a flow of a learning data generation process.

FIGS. 10A and 10B are flowcharts illustrating a flow of a learning data generation process. As illustrated in FIG. 10A, the learning data generating unit 21 sets the number of preferred terminals and path length restriction (S101), evaluates whether or not each attribute of the knowledge base is associated with the problem setting, and registers an evaluation result in the attribute information DB 14 as the static evaluation value (S102). The static evaluation value can also be set by the administrator.

Then, the learning data generating unit 21 sets a searched set of each starting point to "free" (S103), and adds a pair of starting point and free path to each leaf set (S104). Here, the leaf set is a set of nodes included in the extraction range among nodes and edges of the knowledge node. Further, the searched set is a set of nodes in which all connected edges are included in the extraction range among nodes and edges of the knowledge node.

Thereafter, the learning data generating unit 21 searches for several hops from the nodes in each leaf set (S105), and determines whether or not there is a node or edge with a high static evaluation value in the search result (S106).

Then, when there is a node or edge with a high static evaluation value (S106: Yes), the learning data generating unit 21 adds the edges from the search start node to the found edge to the extraction range (S107). Further, the learning data generating unit 21 adds a pair of each of all nodes in the path from the search start node to the found edge and the path from the starting point of the node to the leaf set (S108).

Then, the learning data generating unit 21 adds a pair of outside node of an edge and the path from the starting point to the found edge to the leaf set (S109). Then, the learning data generating unit 21 selects some paths which are not randomly searched for from the leaf set (S110), and searches for an edge connected to the node paired with the selected path (S111).

Thereafter, when there is an unprocessed edge (S112: Yes), the learning data generating unit 21 determines whether or not the outside node of the edge is included in the searched set (S113). Here, when the outside node of the edge is not included in the searched set (S113: No), the learning data generating unit 21 adds the edge to the extraction range (S114), adds the outside node to the leaf set (S115), and repeats the process starting from S112.

On the other hand, when the outside node of the edge is included in the searched set (S113: Yes), the learning data generating unit 21 determines whether or not the path of the node is the preferred terminal or a prescribed number of preferred terminals is absent (S116).

Here, when the path of the node is the preferred terminal or a prescribed number of preferred terminals is absent (S116: Yes), the learning data generating unit 21 changes an original selected path to the preferred terminal (add it when it is new) (S117), and repeats the process starting from S112. On the other hand, when the path of the node is not the preferred terminal or a prescribed number of preferred terminals is present (S116: No), the learning data generating unit 21 repeats the process starting from S112 without executing S117.

When there is no unprocessed edge in S112 (S112: No), the learning data generating unit 21 adds a pair of the original selected path and the node to the searched set (S118). Then, when the size of the extraction range exceeds a resource upper limit (S119: Yes), the learning data generating unit 21 searches for a local maximum path in the searched set other than the preferred terminal (S120).

Then, if there is one which does not satisfy the delay condition in the previous path, the learning data generating unit 21 leaves the path (S121), searches for the node corresponding to the left path from the searched set (S122), and deletes the node from the searched set (S123).

Thereafter, as illustrated in FIG. 10B, the learning data generating unit 21 searches for the edge to which the node is connected from the extraction range (S124) and determines whether or not there is an unprocessed edge (S125).

Then, when there is an unprocessed edge (S125: Yes), the node on the opposite side of the edge is not included in the searched set, and the delay condition is not satisfied (S126: No), the learning data generating unit 21 excludes the edge from the extraction range (S127). On the other hand, when the node on the opposite side of the edge is included in the searched set or the delay condition is satisfied (S126: Yes), the learning data generating unit 21 repeats the process starting from S125 without executing S127.

Then, when the edge to which the opposite side node is connected does is absent in the extraction range (S128: Yes), the learning data generating unit 21 deletes the opposite side node from the leaf set (S129) and repeats the process starting from S125. On the other hand, when the edge to which the opposite side node is connected is present in the extraction range (S128: No), the learning data generating unit 21 repeats the process starting from S125 without executing S129.

When there is no unprocessed edge in S125 (S125: No), the learning data generating unit 21 determines whether the size of the extraction range still exceeds the resource upper limit (S130), and when the size of the extraction range exceeds the resource upper limit (S130: Yes), the learning data generating unit 21 decreases the path length restriction by 1 or changes the preferred terminal (S131), and executes the processes starting from S120.

On the other hand, when the size of the extraction range does not exceed the resource upper limit (S130: No), the learning data generating unit 21 determines whether or not the graph is a prescribed size or more (S132). Here, when the graph is not a prescribed size or more (S132: No), the learning data generating unit 21 repeats the process starting from S105.

On the other hand, when the graph is a prescribed size or more (S132: Yes), the learning data generating unit 21 generates a graph in the extraction range, performs learning using the neural network (S133), executes the dynamic evaluation for each edge in the learning graph, and registers an evaluation result in the attribute information DB 14 (S134).

When there are a prescribed number or more of high dynamic evaluation values (S135: Yes), the learning data generating unit 21 registers the graph at that time point in the learning data DB 15 as the learning data, ends the generation process, and when there are high dynamic evaluation values less than a prescribed number (S135: No), the learning data generating unit 21 repeats the process starting from S105.

When there is no node or edge with a high static evaluation value in S106 (S106: No), the process starting from S110 is executed. When the size of the extraction range does not exceed the resource upper limit (S119: No), the process starting from S132 is executed.

Specific Example

Next, a specific example of the process will be described with reference to FIGS. 11 to 20. Here, an example in which an appropriate graph range is searched from the knowledge base illustrated in FIG. 3, and the learning data (A company) and the learning data (B company) are generated will be described. Further, in order to facilitate understanding of the description, a memory state is visualized and described with reference to FIG. 11. FIG. 11 is a diagram for describing an initialized state of a memory at the time of search start. As illustrated in FIG. 11, in the present embodiment, each of the A company and the B company will be described using a region indicating the leaf set, the extraction range, and the dynamic evaluation result and a region indicating the searched set.

Further, in the specific example, for resource restriction of a computer, up to a total of 35 edges (a resource restriction value) are assumed to be included in the extraction range. Further, as the total evaluation value, it is defined that an attribute with a high static evaluation value is 2, an attribute with a high dynamic evaluation value is 8, an attribute with both a high static evaluation value and a high dynamic evaluation value is 10, and an attribute with both a low static evaluation value and a low dynamic evaluation value is 0. Further, it ends when 6 or more high dynamic evaluation values are included. Further, 1 is set as the number of preferred terminals, and 7 is set as the path length restriction. Further, the delay condition is defined to be "path length+maximum path length on preferred terminal side−total evaluation value path length restriction." The maximum path length on the preferred terminal side indicates the maximum path length in the path from the starting point to the leaf through the targeted preferred terminal.

Initialization

First, the learning data generating unit 21 sets the searched set to "free" for each starting point and adds the pair of starting point and free path to the leaf set. FIG. 12 is a diagram for describing a state in which the pair of starting point and free path is added to the leaf set. As illustrated in FIG. 12, the learning data generating unit 21 adds a pair of the node "A company" which is the starting point and "/(free path)" to the leaf set for the A company, and sets the searched set to "free." Similarly, the learning data generating unit 21 adds a pair of the node "B company" which is the starting point and "/(free path)" to the leaf set for the B company, and sets the searched set to "free."

When Search Starts

Figure 13A:
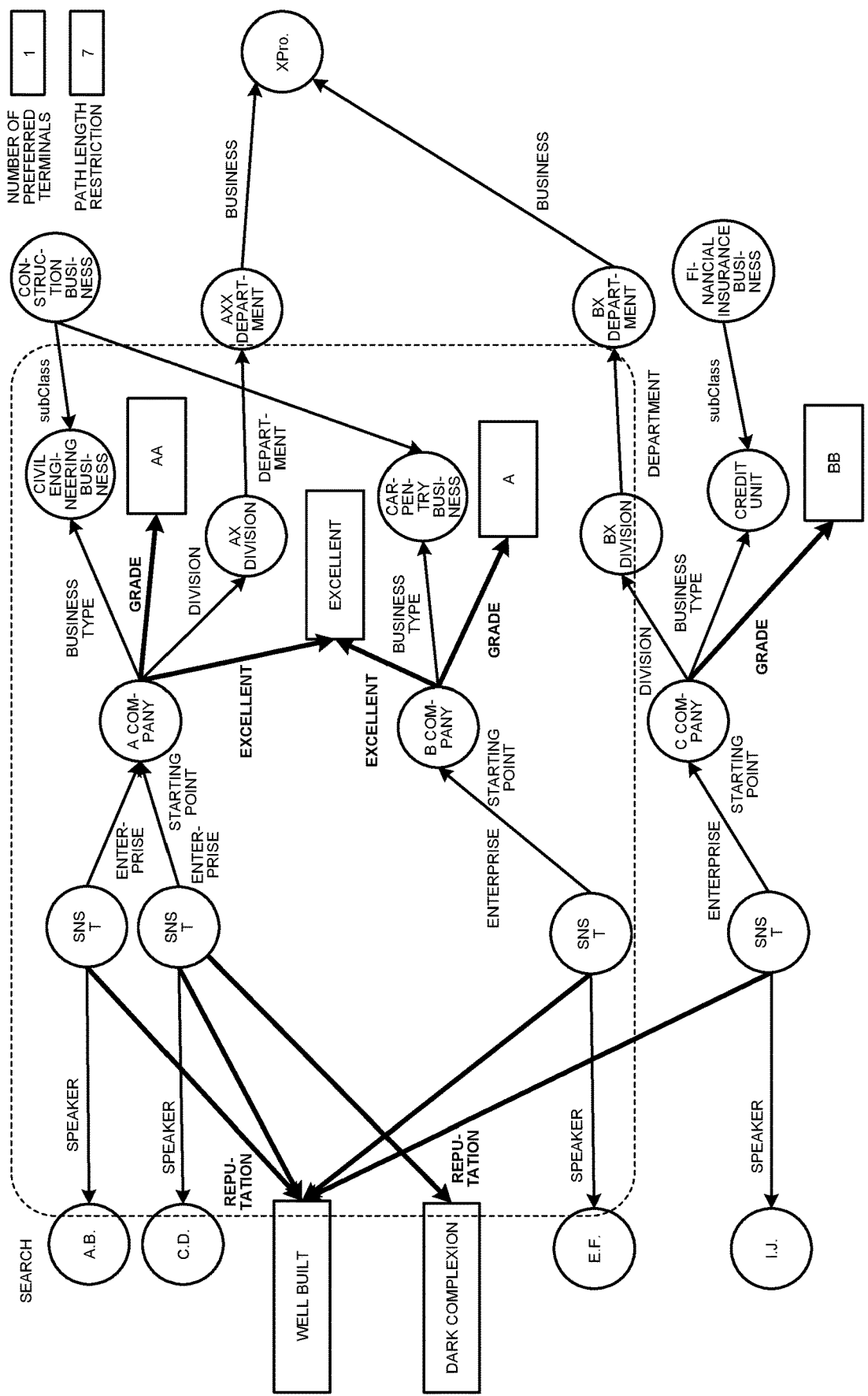
FIG. 13A is a diagram for describing when a search starts.

Then, the learning data generating unit 21 searches up to several hops from the node in the leaf set, and searches for an edge with a high static evaluation value. FIG. 13A is a diagram for describing when a search starts, and FIG. 13B is a diagram for describing a memory storage state at the time of search start. As illustrated in FIG. 13A, the learning data generating unit 21 determines, for example, up to two hops as the search range for the starting point "A company" and the starting point "B company." Then, the learning data generating unit 21 finds "grade" and "reputation" which are edges with a high static evaluation value. The edge "excellent" is excluded as it is a solution.

Thereafter, the learning data generating unit 21 adds the edges from the start search node to the found edge in the extraction range. Further, the learning data generating unit 21 adds a pair of each of all nodes in the path from the search start node to the found edge and the path from the starting point of the node to the leaf set. Further, the learning data generating unit 21 adds a pair of the outside node of an edge and the path from the starting point to the found edge to the leaf set.

As a result, the learning data generating unit 21 adds the node and the edge to the extraction range as illustrated in FIG. 13B. Specifically, for the "A company," the learning data generating unit 21 adds the node "AA" which is the leaf node of the edge "grade" with the high static evaluation value among the edges within two hops from the start search node "A company." Similarly, the learning data generating unit 21 adds the edge "enterprise," the node "SNS T," and the node "well built" which are a route to "well built" which is the leaf node of the edge "reputation" with the high static evaluation value. Further, the learning data generating unit 21 adds the edge "enterprise," the node "SNS T," and the node "dark complexion" which are a route to "dark complexion" which is the leaf node of the edge "reputation" with a high static evaluation value.

Further, for the "B company," the learning data generating unit 21 adds the node "A" which is the leaf node of the edge "grade" with the high static evaluation value among the edges within two hops from the start search node "B company." Similarly, the learning data generating unit 21 adds the edge "enterprise," the node "SNS T," and the node "well built" which are a route to "well built" which is the leaf node of the edge "reputation" with the high static evaluation value. As a result, the number of edges registered for the A company is "6," and the number of edges registered for the B company is "3." Since learning is not yet performed, the dynamic evaluation value is not calculated yet.

State 1

Figure 14A:
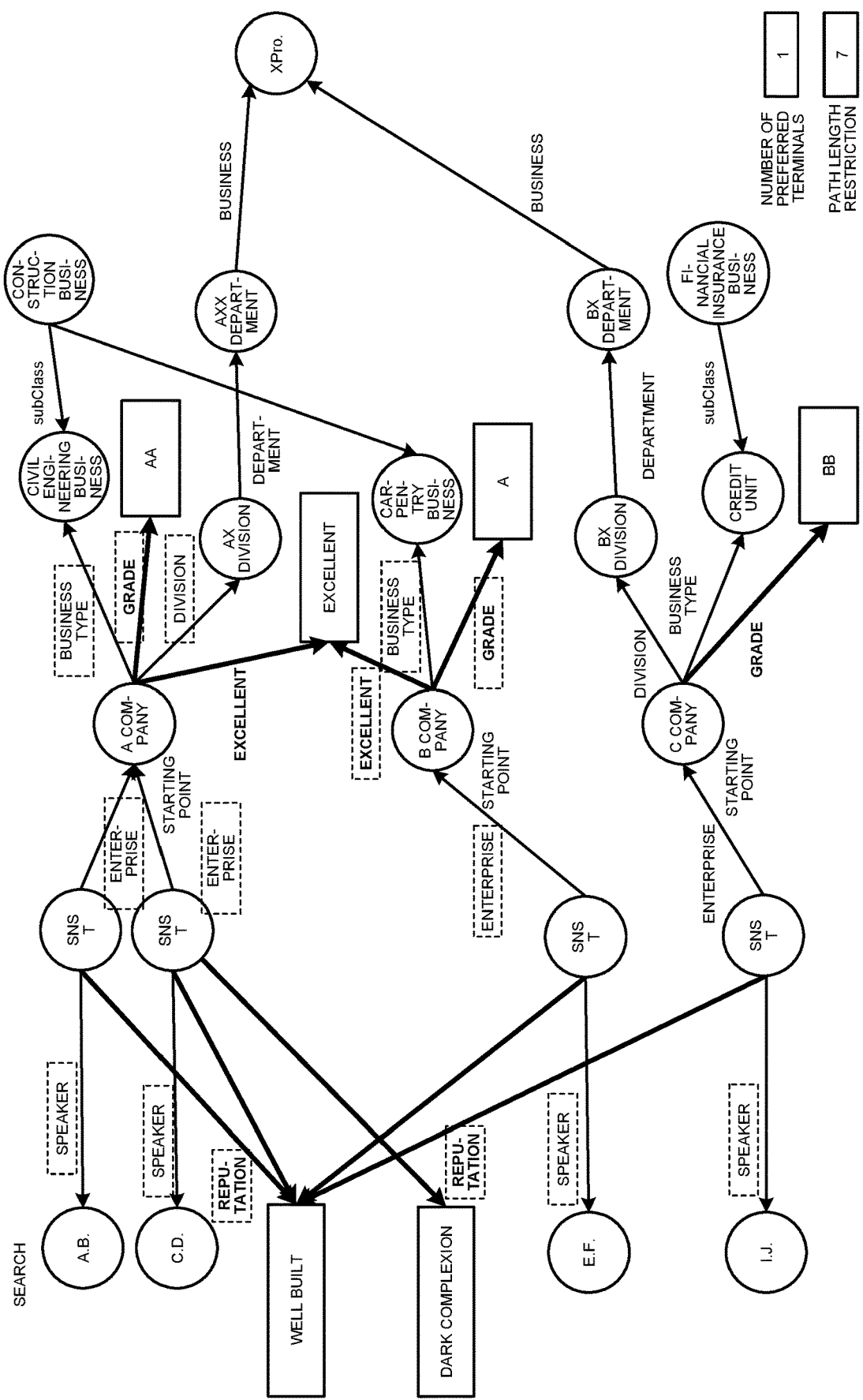
FIG. 14A is a diagram for describing a state 1 after a search starts.

Then, the learning data generating unit 21 randomly selects some non-searched paths from the leaf set, and searches for the edge connected to the node paired with the selected path. FIG. 14A is a diagram for describing the state 1 after the search starts, and FIG. 14B is a diagram for describing the memory storage state in the state 1.

Specifically, the learning data generating unit 21 selects "/(free path)" and "ˆ enterprise" which are not searched from the state of FIG. 13B for both the A company and the B company. Then, as illustrated in FIG. 14A, the learning data generating unit 21 detects for the A company the edges "business type," "ˆ enterprise," "grade," "excellent," and "division" as the edges connected to the node paired with "/", and detects the edges "enterprise," "speaker," and "reputation" as the edges connecting to the node paired with "ˆ enterprise."

Similarly, as illustrated in FIG. 14A, the learning data generating unit 21 detects for the B company the edges "business type," "ˆ enterprise," "grade," and "excellent" as the edges connected to the node paired with "/", and detects the edges "enterprise," "speaker," and "reputation" as the edges connecting to the node paired with "ˆ enterprise."

Thereafter, for the A company, as illustrated in FIG. 14B, since the outside (leaf) node "civil engineering business" of the edge "business type" and the outside node "AX division" of the edge "division" are not included in the searched set, the learning data generating unit 21 adds the edge "business type" and the edge "division" to the extraction range, and adds the nodes "civil engineering business" and the "AX division" to the leaf set. Further, since the outside nodes "A,B" and "C,D" of "ˆ enterprise" and the edge "speaker" are not included in the searched set, the learning data generating unit 21 adds the edge "speaker" to the extraction range, and adds the nodes "A,B" and "C,D" to the leaf set.

Then, the learning data generating unit 21 includes the node "A company," the node "SNS T," and the node "SNS T" in which all the neighboring nodes connected to their own nodes are already searched in the searched set.

Similarly, for the B company, as illustrated in FIG. 14B, since the outside node "carpentry business" of the edge "business type" is not included in the searched set, the learning data generating unit 21 adds the edge "business type" to extraction range and adds the node "carpentry business" to the leaf set. Further, since the outside node "E,F" of "ˆ enterprise" and the edge "speaker" are not included in the searched set, the learning data generating unit 21 adds the edge "speaker" to the extraction range and adds the node "E,F" to the leaf set.

Then, the learning data generating unit 21 includes the node "B company" in which all the neighboring nodes connected to their own nodes are already searched and the node "SNS T" connected by the edge "ˆ enterprise" in the searched set.

As a result, the number of edges registered for the A company is "10," and the number of edges registered for the B company is "5." Since learning is not yet performed, the dynamic evaluation value is not calculated yet. Further, the learning data generating unit 21 sets "ˆ enterprise" as the preferred terminal since "enterprise" is the outside node, and the preferred terminal is not specified.

Here, if a total of the number of edges is set to "20" as the initial learning reference, at the stage of FIG. 14B, a total of the number of edges of the extraction target is "15," and thus the initial learning reference is not satisfied. In this regard, the learning data generating unit 21 further adds the edge with the high static evaluation value or the like to the extraction range. FIG. 14C is a diagram for describing addition of the extraction range in the state 1.

For an enterprise A, the learning data generating unit 21 detects the edge "ˆ reputation" with a high static evaluation value among the edges connected to the preferred terminal from the state of FIG. 14B, and searches for the node "SNS T" which is the outside node of "ˆ reputation." As a result, as illustrated in FIG. 14C, the learning data generating unit 21 adds the node "SNS T" connected with the node "well built" via the edge "ˆ reputation" and the node "SNS T" connected with the node "dark complexion" via the edge "ˆ reputation" to the leaf set" and adds the edge "ˆ reputation" to the extraction range.

Similarly, for the enterprise B, the learning data generating unit 21 detects the edge "ˆ reputation" with a high static evaluation value among the edges connected to the preferred terminal from the state of FIG. 14B, and searches for the node "SNS T" which is the outside node of "ˆ reputation." As a result, as illustrated in FIG. 14C, the learning data generating unit 21 adds three nodes "SNS T" connected with the node "well built" via the edge "ˆ reputation" to the leaf set and adds the edge "ˆ reputation" to the extraction range.

As a result, since the number of edges registered for the A company is "12," the number of edges registered for the B company is "9," and the total number of edges is "21" and exceeds initial learning reference "20," the learning data generating unit 21 generates the learning graph with the extraction range specified in the state 1, inputs the learning graph to the neural network, and executes the learning. Then, the learning data generating unit 21 registers the dynamic evaluation value obtained by the learning result in the attribute information DB 14.

FIG. 14D is a diagram illustrating the learning result in the state 1. As illustrated in FIG. 14D, the dynamic evaluation value of "grade=AA" is increased by learning of the learning graph in the state 1. However, since the number of high dynamic evaluation values is 1 and smaller than 6 which is a target, the extraction range is changed.

State 2: Expansion of Extraction Range

Then, the learning data generating unit 21 executes a process similar to that in the state 1 and expands the extraction range. Specifically, the learning data generating unit 21 selects some paths which are not randomly searched from the leaf set, and searches for the edge connected to the node paired with the selected path. Here, for the A company and the B company, the learning data generating unit 21 selects "business type" and "^ enterprise/reputation," detects "^ business type" and "^ subClass" in "business type," and detects "^ reputation" in "^ enterprise/reputation."

Then, for the A company and the B company, since the outside node "construction business" of the edge "business type"—the edge "^ subClass" is not included in the searched set, the learning data generating unit 21 adds "^ subClass" to the extraction range, and adds "construction business" to the leaf set. Since a part of the edge "^ reputation" of "^ enterprise/reputation" is already included in the searched set, nothing is performed on it. The remaining edges detected in the state 2 are processed similarly, all the edges are processed, and the state in FIG. 15A is stored in memory.

Figure 15A:
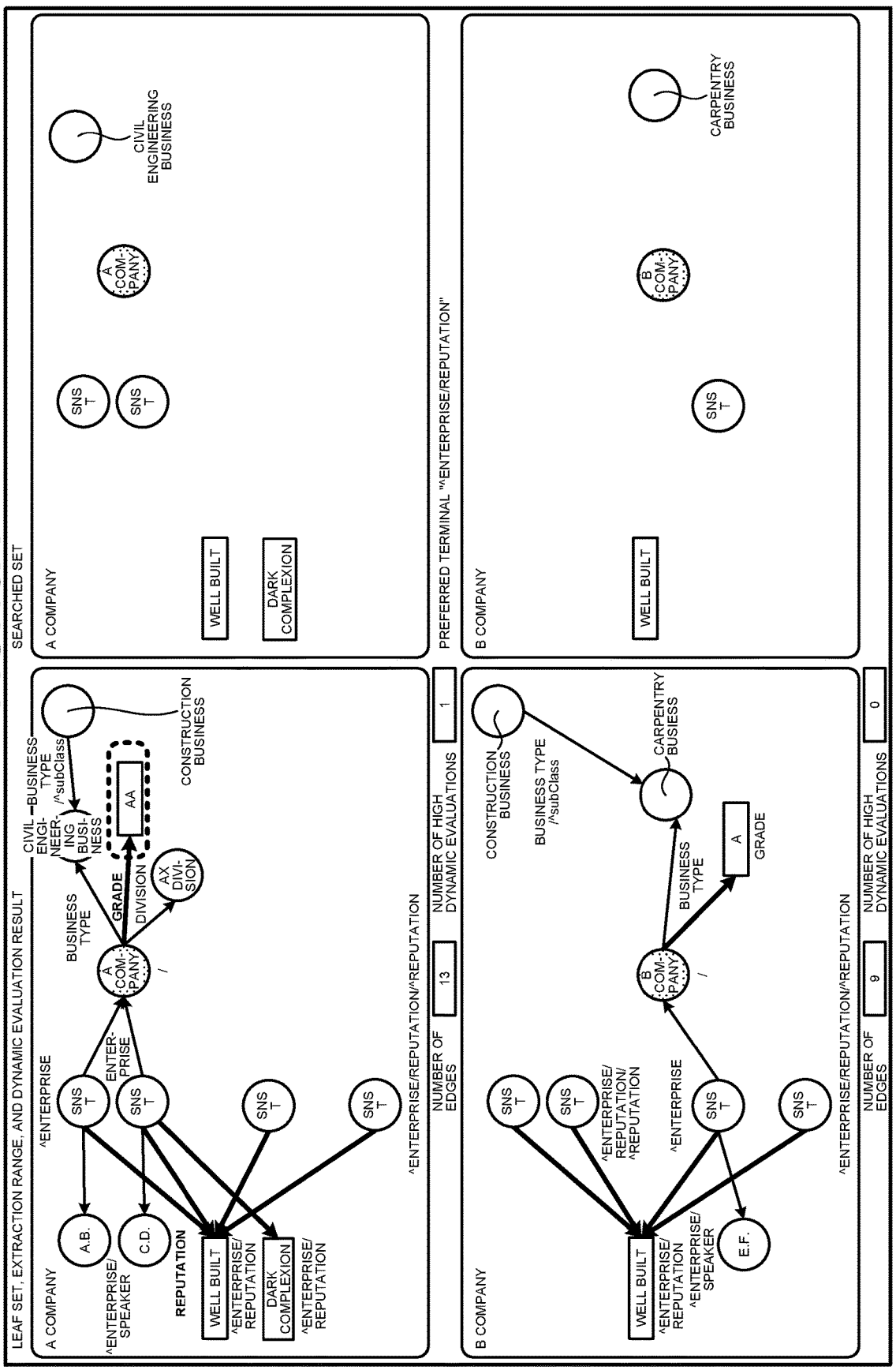
FIG. 15A is a diagram for describing a memory storage state of a state 2.

FIG. 15A is a diagram for describing the memory storage state of the state 2. As compared with FIG. 14D, in the memory storage state illustrated in FIG. 15A, the node "construction business" of the path "business type/^ subClass" is added to both the A company and the B company. Further, as the searched node, for the A company, the nodes "well built," "dark complexion," and "construction business" are added, and for the B company, the nodes "well built" and "carpentry business" are added. Further, the learning data generating unit 21 sets "^ enterprise/reputation" as the preferred terminal since "well built" and "dark complexion" are the outside nodes.

Since the total number of edges of the extraction range, that is, "22" does not exceed the resource restriction "35," the learning data generating unit 21 generates the learning graph with the extraction range specified in the state 2, inputs the learning graph to the neural network, and performs the learning. Then, the learning data generating unit 21 registers the dynamic evaluation value obtained by the learning result in the attribute information DB 14.

Figure 15B:
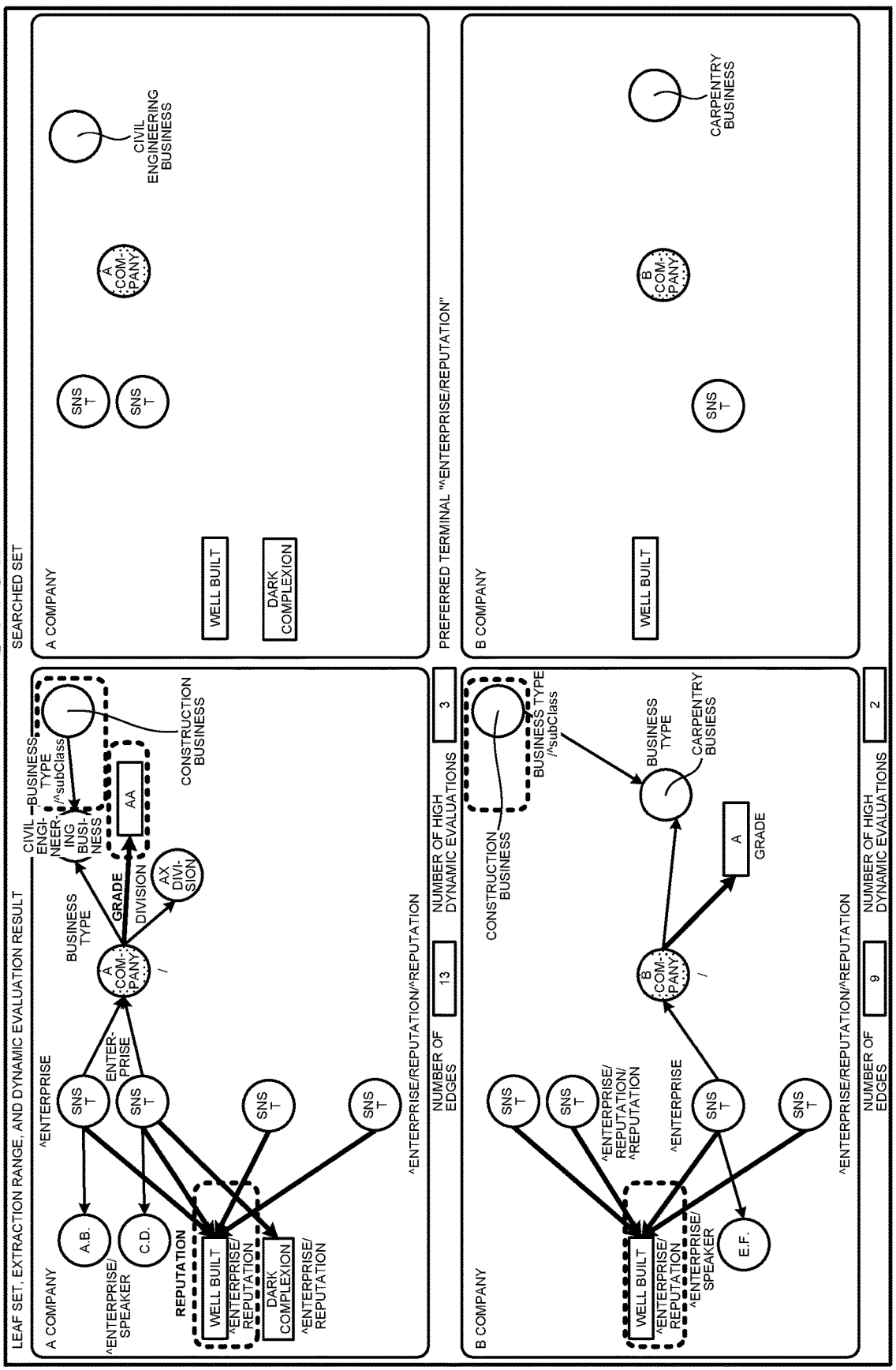
FIG. 15B is a diagram illustrating a learning result in a state 2.

FIG. 15B is a diagram illustrating the learning result in the state 2. As illustrated in FIG. 15B, by learning of the learning graph in the state 2, for the A company, the dynamic evaluation values of "grade=AA," "business type/^ subClass=construction business" and "^ enterprise/reputation=well built" are increased, and for the B company, the dynamic evaluation values of "business type/^ subClass=construction business" and "^ enterprise/reputation=well built" are increased. As a result, it is found that the determination accuracy can be improved by a combination of "business type" and "reputation." Further, since the reputation information with a high static evaluation value is included in the extraction range early, it is possible to find this combination with a small number of trials. However, because the number of high dynamic evaluation values is 5 and smaller than 6 which is a target, the extraction range is changed.

State 3

Then, the learning data generating unit 21 executes a process similar to those in the state 1 and the state 2 and expands the extraction range. Specifically, the learning data generating unit 21 searches for two or less hops from the node in the leaf set, finds "excellent" and "grade" with a high static evaluation value, and includes "excellent" and "grade" with a high static evaluation value in the extraction range. As a result, the learning data generating unit 21 preferentially includes, in the extraction range, the paths "^ enterprise/reputation/^ reputation/^ enterprise/excellent" and "^ enterprise/reputation/^ reputation/^ enterprise/grade" which are high in the static evaluation value and far from the starting point.

Figure 16A:
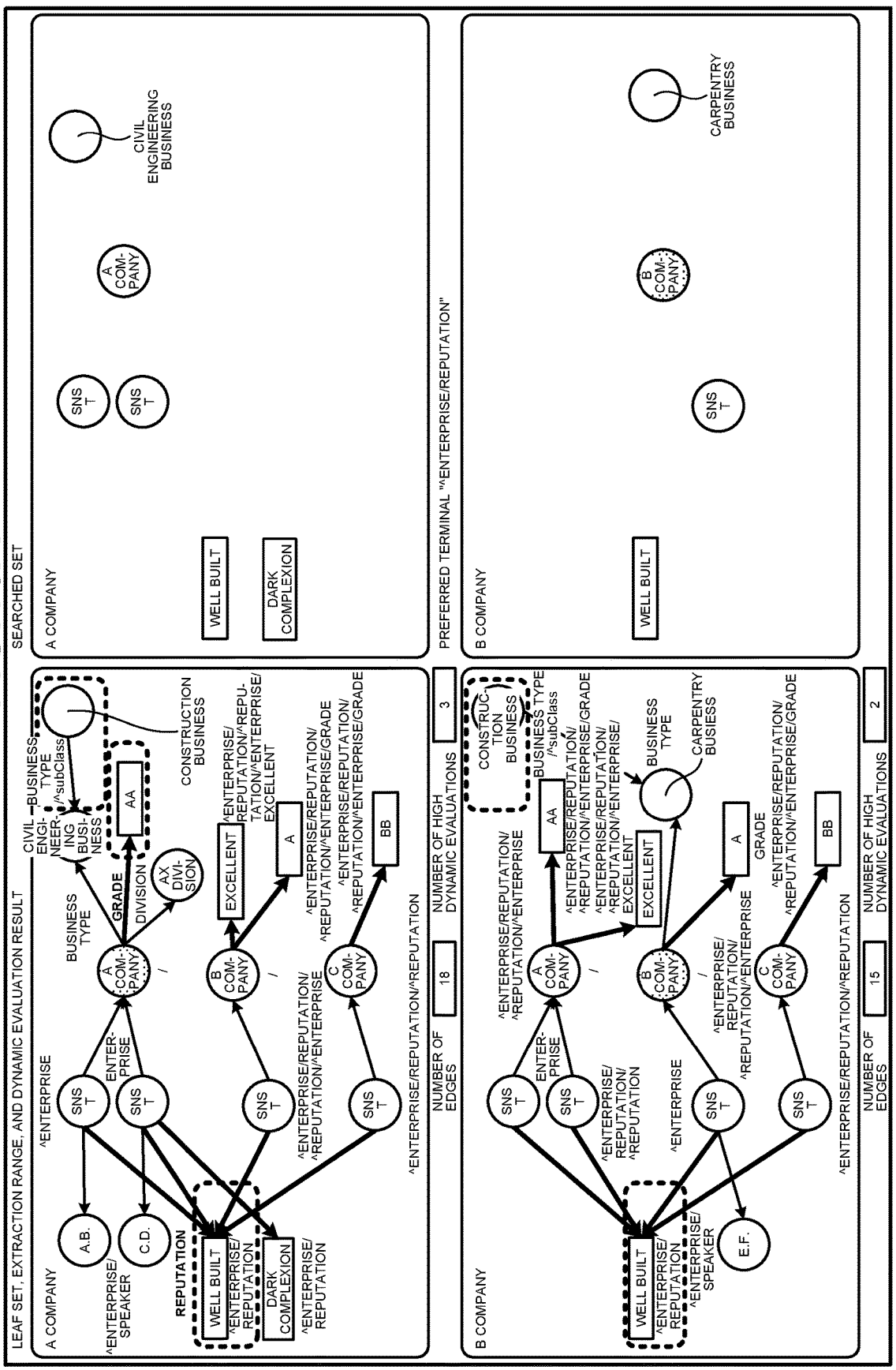
FIG. 16A is a diagram for describing a memory storage state of a state 3.

As a result, the state 3 is the memory storage state as illustrated in FIG. 16A. FIG. 16A is a diagram for describing the memory storage state of the state 3. As illustrated in FIG. 16A, for the learning data "A company," the node "B company" and the node "excellent" or "A" connected to the node "B company" are added, and the nodes "C company" and the node "BB" connected to the node "C company" are added. Further, as illustrated in FIG. 16A, for the learning data "B company," each node related to the starting point "A company" is added, and the node "C company" and the node "BB" connected to the node "C company" are added. In this state, a total of the number of edges is "33," and the number of edges with a high dynamic evaluation value remains "5".

Further, the learning data generating unit 21 continues to expand the extraction range also for those with a low static evaluation value. Specifically, for the learning data "A company," the learning data generating unit 21 adds the edge "speaker"—the node "E,F," the edge "speaker"—the node "I,J," and the edge "grade"—the node "AXX department." Similarly, for the learning data "B company," the learning data generating unit 21 adds the edge "speaker"—the node "A,B," the edge "speaker"—the node "C,D," and the edge "speaker"—the node "I,J."

Figure 16B:
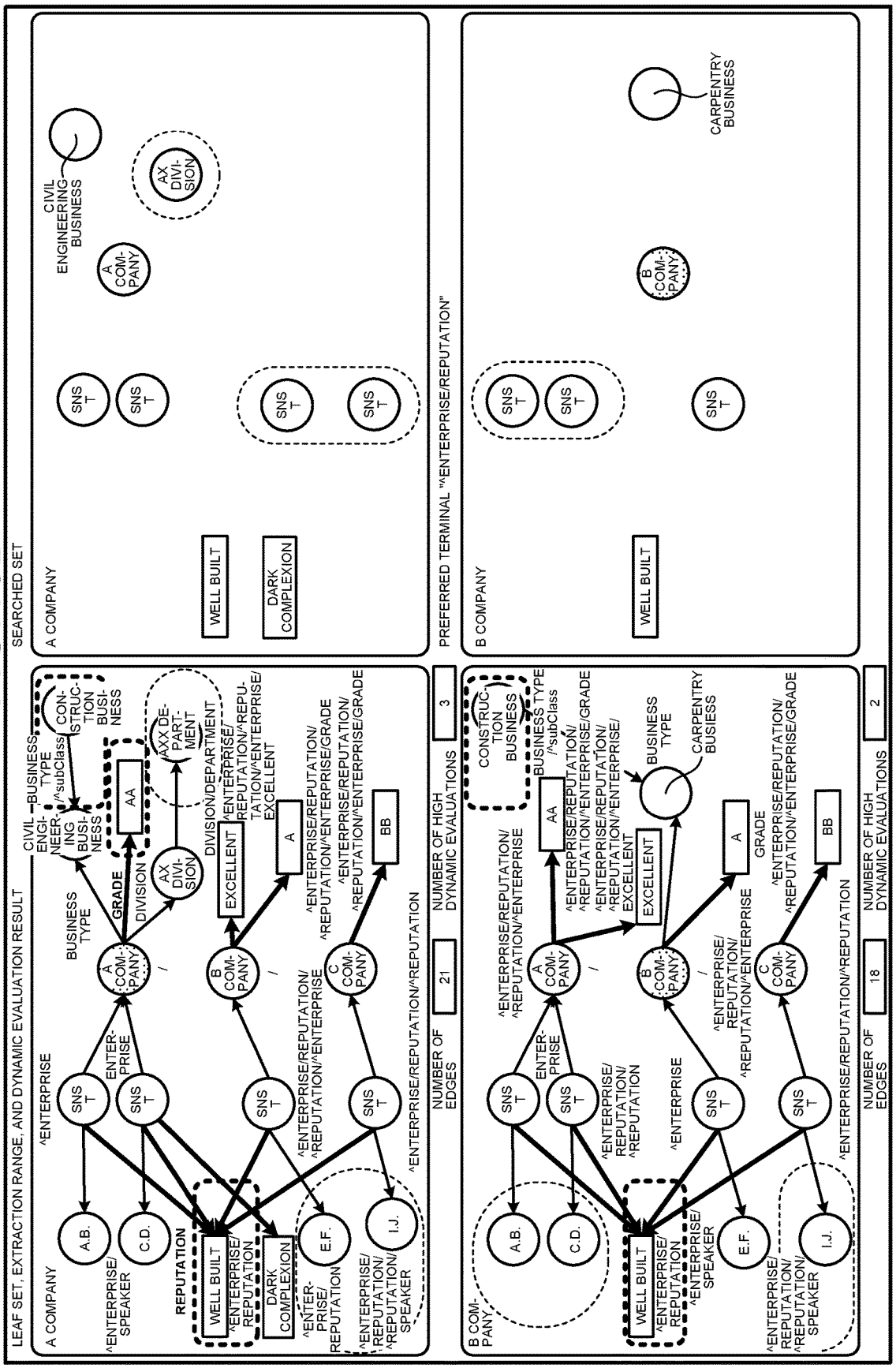
FIG. 16B is a diagram for describing addition of an extraction range in a state 3.

As a result, the memory storage state is updated from the state of FIG. 16A to the state of FIG. 16B. FIG. 16B is a diagram for describing addition of the extraction range in the state 3. As illustrated in FIG. 16B, for the learning data "A company," three edges and nodes associated therewith are added as described above. Further, as illustrated in FIG. 16B, for the learning data "B company," three edges and nodes associated therewith are added as described above. Further, for the A company, the learning data generating unit 21 includes the node "AX division" and the two nodes "SNS T" in which the neighboring nodes are searched in the searched set, and for the B company, the learning data generating unit 21 includes the two nodes "SNS T" in which the neighboring nodes are searched in the searched set.

In this state, the number of edges with a high dynamic evaluation value remains "5", but a total of the number of edges is "38" and exceeds "35" which is the resource restriction value. For this reason, the learning data generating unit 21 reduces the extraction range in terms of resources.

State 4: Reduction of Extraction Range

Then, the learning data generating unit 21 specifies "business type" and "division" which are local maximum paths in the searched set other than the preferred terminal, and determines to reduce the extraction range for them.

First, the learning data generating unit 21 checks the delay condition for the path "business type/^ subClass" before "business type." Here, since the dynamic evaluation value of the path "business type/^ subClass" is high, the learning data generating unit 21 determines whether or not the total evaluation value "the number of hops-8" is smaller than the path length restriction. The number of hops is 7 obtained by adding the path length 2 of "^ business type/^ subClass" and the maximum path length 5 of "enterprise/reputation/A reputation/A enterprise/grade." Therefore, the learning data generating unit 21 determines that the delay condition is satisfied since the total evaluation value "7−8=−1" path length restriction (7) is satisfied. As a result, the learning data generating unit 21 sets the path "business type/^ sub-Class" as the non-deletion target.

Then, the learning data generating unit 21 checks the delay condition for the path "division/department" before "division." Here, since the static evaluation value and the dynamic evaluation value of the path "division/department" are both low, the learning data generating unit 21 determines whether or not the total evaluation value "the number of hops−0" is smaller than the path length restriction. The number of hops is 7 obtained by adding the path length 2 of "division/department" and the maximum path length 5 of "^ enterprise/reputation/^ reputation/^ enterprise/grade." Therefore, the learning data generating unit 21 determines that the delay condition is satisfied since the total evaluation value "7−0=7"≤path length restriction (7) is satisfied. As a result, the learning data generating unit 21 sets the path "division/department" as the non-deletion target.

Here, since there is no change from the total number of edges "39" of the extraction range, and the resource restriction "35" is still exceeded, the path length restriction is temporarily reduced to "6." In this case, the learning data generating unit 21 determines that the delay condition is still satisfied for the path "business type/^ subClass" before "business type" since the total evaluation value "7−8=−1"≤path length restriction (6) is satisfied. However, the learning data generating unit 21 determines the path "division/department" before "division" as the deletion target since the total evaluation value "7−0=7"≤path length restriction (6) is not satisfied.

Figure 17A:
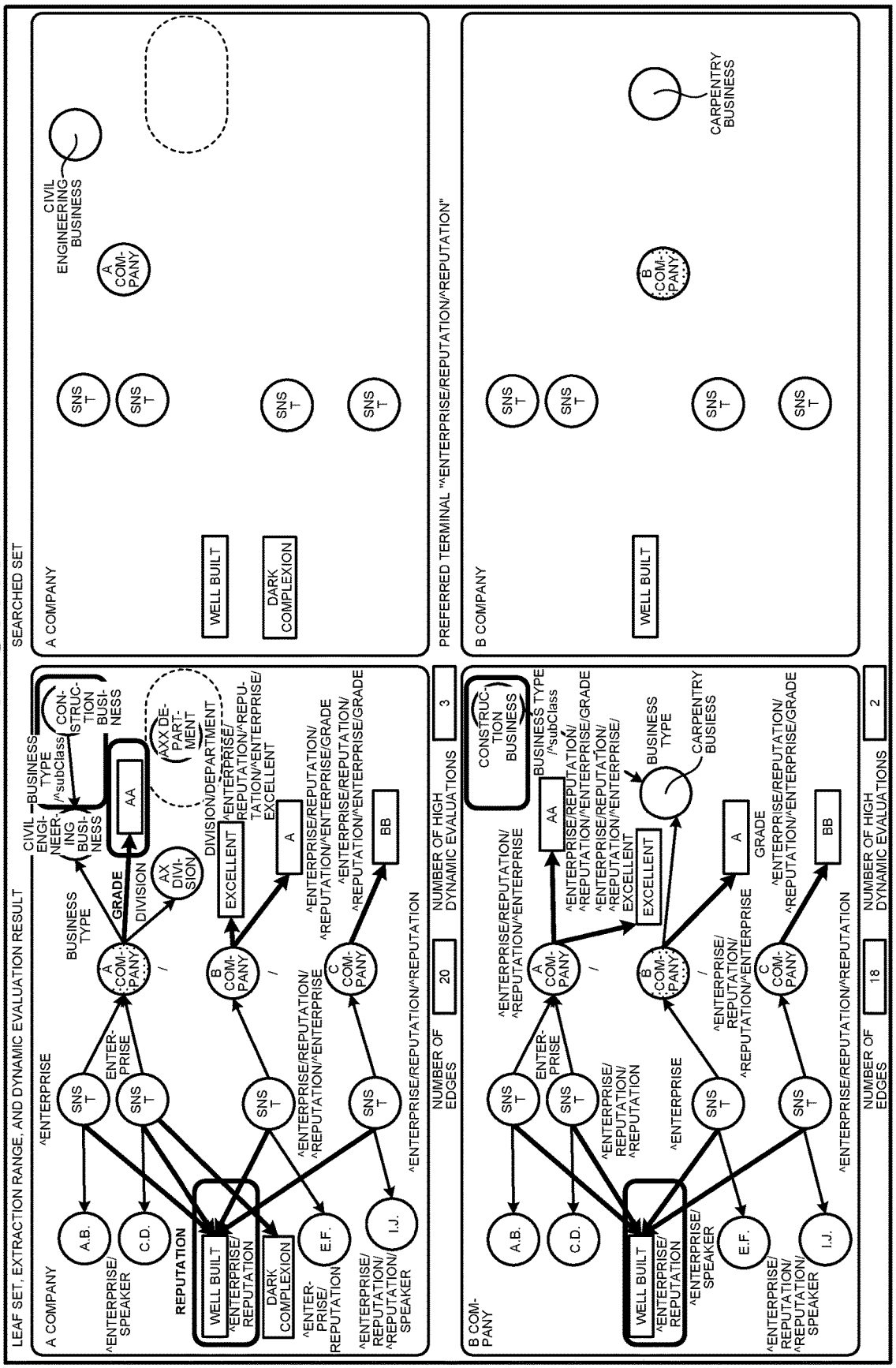
FIG. 17A is a diagram for describing scaling-down of an extraction range.

As a result, as illustrated in FIG. 17A, the learning data generating unit 21 updates the leaf set and the searched set. FIG. 17A is a diagram for describing the reduction of the extraction range. As illustrated in FIG. 17A, the learning data generating unit 21 searches for the node corresponding to "division" from the searched set and obtains "AX division." Then, the learning data generating unit 21 deletes "AX division" from the searched set.

Further, the learning data generating unit 21 searches for the edge connected to "AX division" from the extraction range and obtains "A company"→"AX division" and "AX division"→"AXX department." Then, for the extraction range, the learning data generating unit 21 does nothing because the node "A company" on the opposite side is included in the searched set, but deletes the edge since the node "AXX department" on the opposite side is not included in the searched set. As a result, the number of edges in the extraction range of the A company changes from "21" to "20."

Figure 17B:
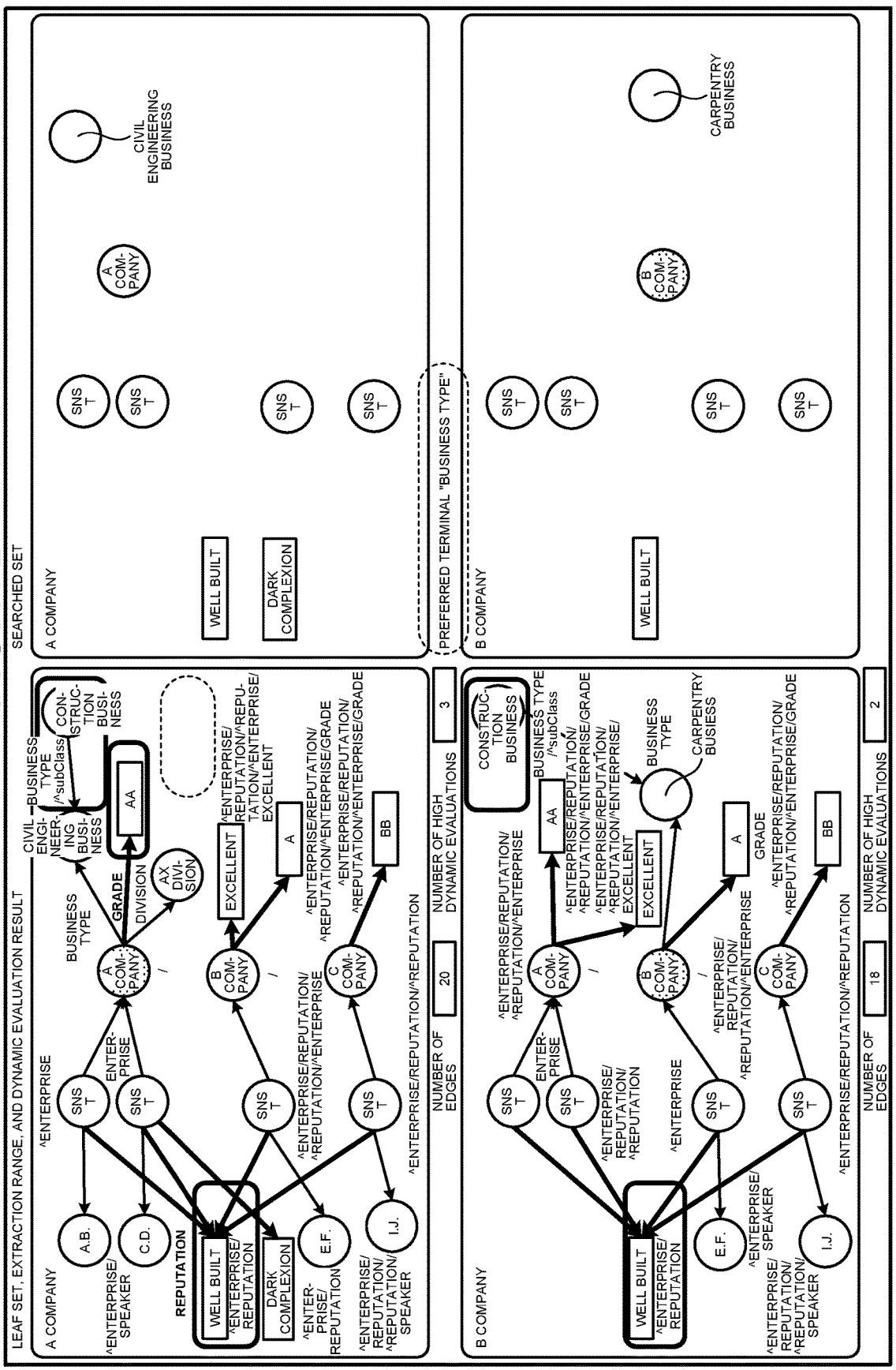
FIG. 17B is a diagram for describing further scaling-down of the extraction range.

Then, the learning data generating unit 21 searches for nodes with no edge in the reduced extraction range. FIG. 17B is a diagram for describing further reduction of the extraction range. As illustrated in FIG. 17B, the learning data generating unit 21 deletes the node "AXX division" in the extraction range of the A company from the extraction range because the edge is not included in the extraction range. As described above, the learning data generating unit 21 executes the process on all deletion candidate edges, but since the total number of edges "38" in the extraction range still exceeds the resource restriction "35," the preferred terminal is changed to "business type."

State 5: Reduction of Extraction Range

Then, the learning data generating unit 21 specifies "^ enterprise/reputation/^ reputation" which is a local maximum path in the searched set other than the preferred terminal "business type." Then, for the A company and the B company, the learning data generating unit 21 determines to reduce the extraction range for the corresponding path in the paths "reputation, enterprise/grade, enterprise/excellent, speaker" before it.

Specifically, the learning data generating unit 21 determines to reduce the extraction range for the path "^ enterprise/reputation/^ reputation/reputation." For example, since the static evaluation value is high, the learning data generating unit 21 determines that the delay condition is satisfied since the total evaluation value "path length 2 of "(reputation)+maximum path length 2 of the preferred terminal "business type"−2=2≤path length restriction (6) is satisfied. As a result, the learning data generating unit 21 sets the path "^ enterprise/reputation/^ reputation/reputation" as the non-deletion target.

Further, the learning data generating unit 21 determines to reduce the extraction range for the path "^ enterprise/reputation/^ reputation/speaker." For example, since each evaluation value is low, the learning data generating unit 21 determines that the delay condition is satisfied since the total evaluation value "path length 4 of "speaker"+maximum path length 2 of preferred terminal "business type"−0=6≤path length restriction (6) is satisfied. As a result, the learning data generating unit 21 sets the path "^ enterprise/reputation/^ reputation/speaker" as the non-deletion target.

Further, the learning data generating unit 21 determines to reduce the extraction range for the path "^ enterprise/reputation/^ reputation/enterprise/grade." For example, since the static evaluation value is high, the learning data generating unit 21 determines that the delay condition is satisfied since the total evaluation value "path length 5 of (enterprise/grade)+maximum path length 2 of preferred terminal "business type"−2=5≤path length restriction (6) is satisfied. As a result, the learning data generating unit 21 sets the path "^ enterprise/reputation/^ reputation/enterprise/grade" as the non-deletion target.

Similarly, the learning data generating unit 21 determines to reduce the extraction range for the path "^ enterprise/reputation/^ reputation/enterprise/excellent." For example, since the static evaluation value is high, the learning data generating unit 21 determines that the delay condition is satisfied since the total evaluation value "path length 5 of (enterprise/excellent)+maximum path length 2 of preferred terminal "business type"−2=5≤path length restriction (6) is satisfied. As a result, the learning data generating unit 21 sets the path "^ enterprise/reputation/^ reputation/enterprise/excellent" as the non-deletion target.

State 6: Reduction Again after Path Length Restriction is Changed

Figure 18:
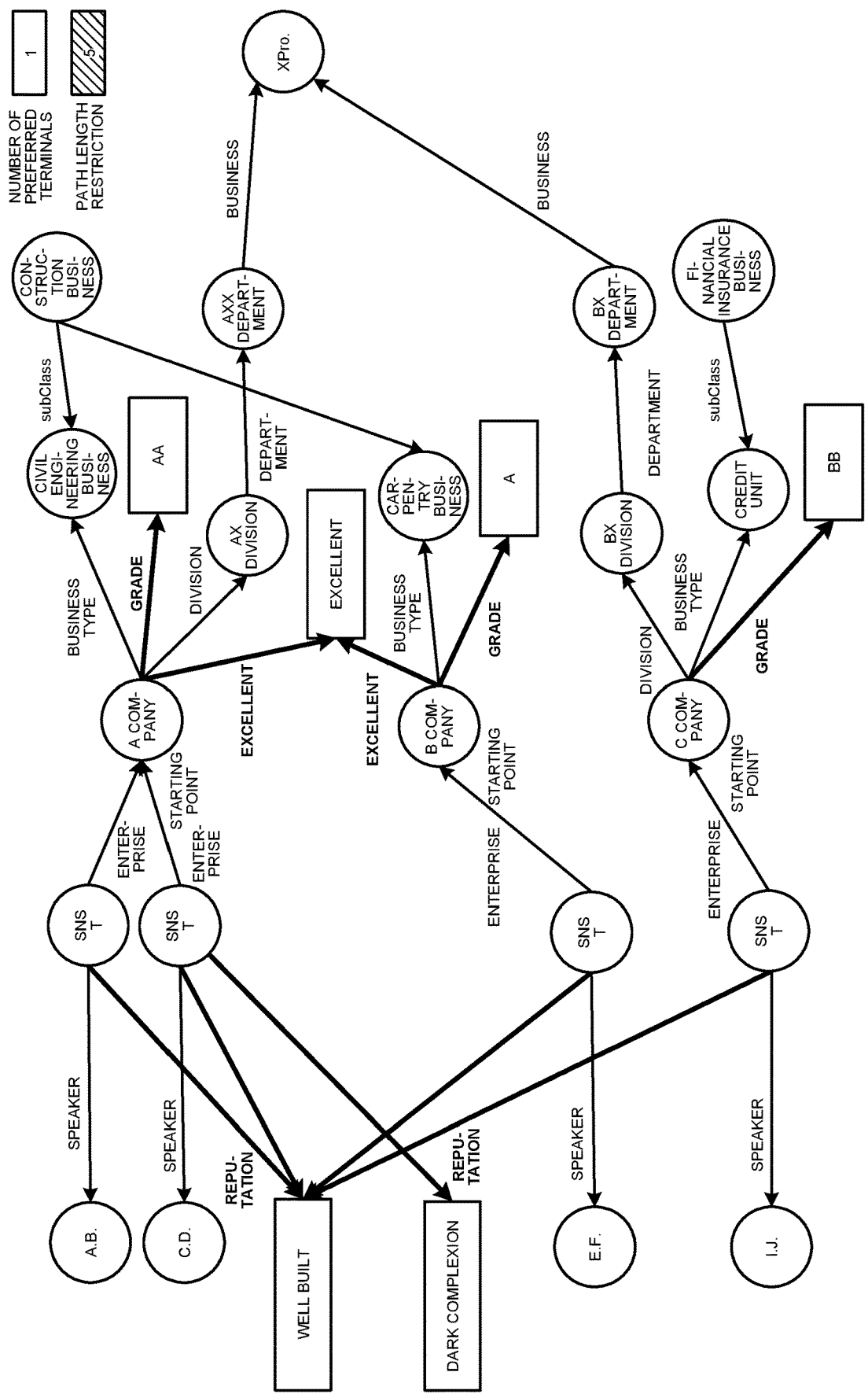
FIG. 18 is a diagram illustrating a modified example of path length restriction.

Here, the learning data generating unit 21 reduces the path length restriction since all satisfy the delay condition. FIG. 18 is a diagram illustrating a modified example of the path length restriction. As illustrated in FIG. 18, the learning data generating unit 21 reduces the path length restriction from "6" to "5," and maintains other information. Then, the learning data generating unit 21 determines to reduce the extraction range for the corresponding path among the paths "reputation, enterprise/grade, enterprise/excellent, speaker" before "^ enterprise/reputation/^ reputation" which is a local maximum path in the searched set other than the preferred terminal "business type" again.

Then, as described above, the total evaluation value "2+2−2=2"≤path length restriction (5) is satisfied for the path "^ enterprise/reputation/^ reputation/speaker," and the total evaluation value "5+2−2=5"≤path length restriction (5) is satisfied also for the path "^ enterprise/reputation/^ reputation/enterprise/excellent" and the path "^ enterprise/reputation/^ reputation/enterprise/grade." However, the total evaluation value "4+2−0=6"≤path length restriction (5) is not satisfied for the path "^ enterprise/reputation/^ reputation/speaker." For this reason, the learning data generating unit 21 determines it as the deletion target since "speaker" does not satisfy the delay condition.

Figure 19:
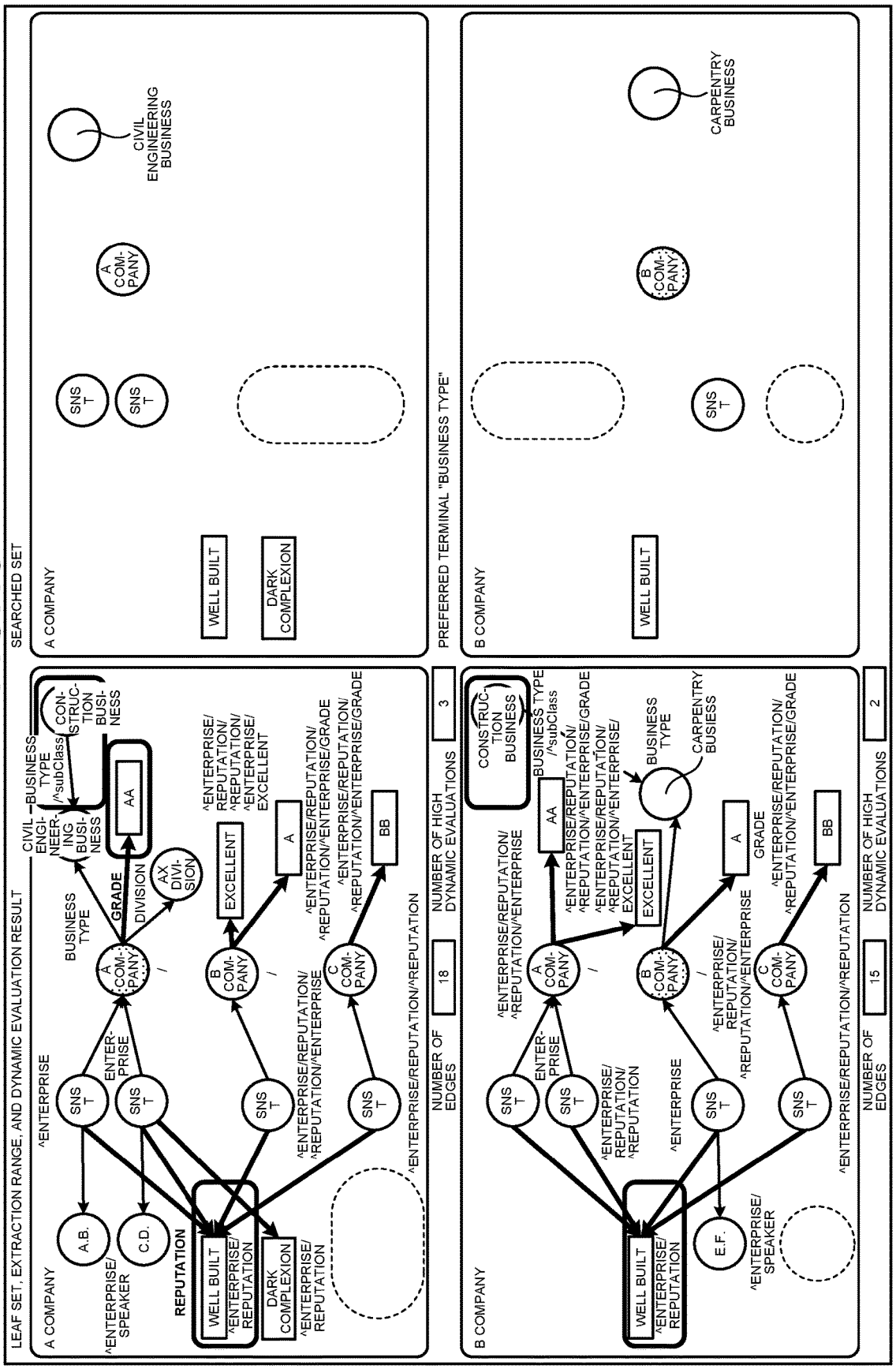
FIG. 19 is a diagram for describing scaling-down of an extraction range.

As a result, as illustrated in FIG. 19, the learning data generating unit 21 updates the leaf set and the searched set. FIG. 19 is a diagram for describing reduction of the extraction range. As illustrated in FIG. 19, the learning data generating unit 21 searches for the node corresponding to "speaker" from the searched set and obtains "SNS T." Then, the learning data generating unit 21 deletes "SNS T" from the searched sets of the A company and the B company.

Further, the learning data generating unit 21 searches for the edge connected to "SNS T" from the extraction range, and obtains "SNS T"→"E,F" and "SNS T" →"I,J" from the extraction range of the A company. Then, for the extraction range, since the node "SNS T" on the opposite side is not included in the searched set, the learning data generating unit 21 deletes the node and edge of "E,F" and the node and edge of "I,J." As a result, the number of edges in the extraction range of the A company changes from "20" to "18."

Further, the learning data generating unit 21 searches for the edge connected to "SNS T" from the extraction range, and obtains "SNS T"→"A,B," "SNS T"→"C,D," and "SNS T"→"I,J" from the extraction range of the B company. Then, for the extraction range, the learning data generating unit 21 deletes each node and each edge which are searched since the node "SNS T" on the opposite side is not included in the searched set. As a result, the number of edges in the extraction range of the B company changes from "18" to "15."

With such a process, since the total number of edges in the extraction range is "33" and falls within the resource restriction "35," the learning data generating unit 21 generates the learning data with the extraction range, inputs the learning data to the neural network, and executes the learning. Then, the learning data generating unit 21 registers the dynamic evaluation value obtained by the learning result in the attribute information DB 14.

Figure 20:
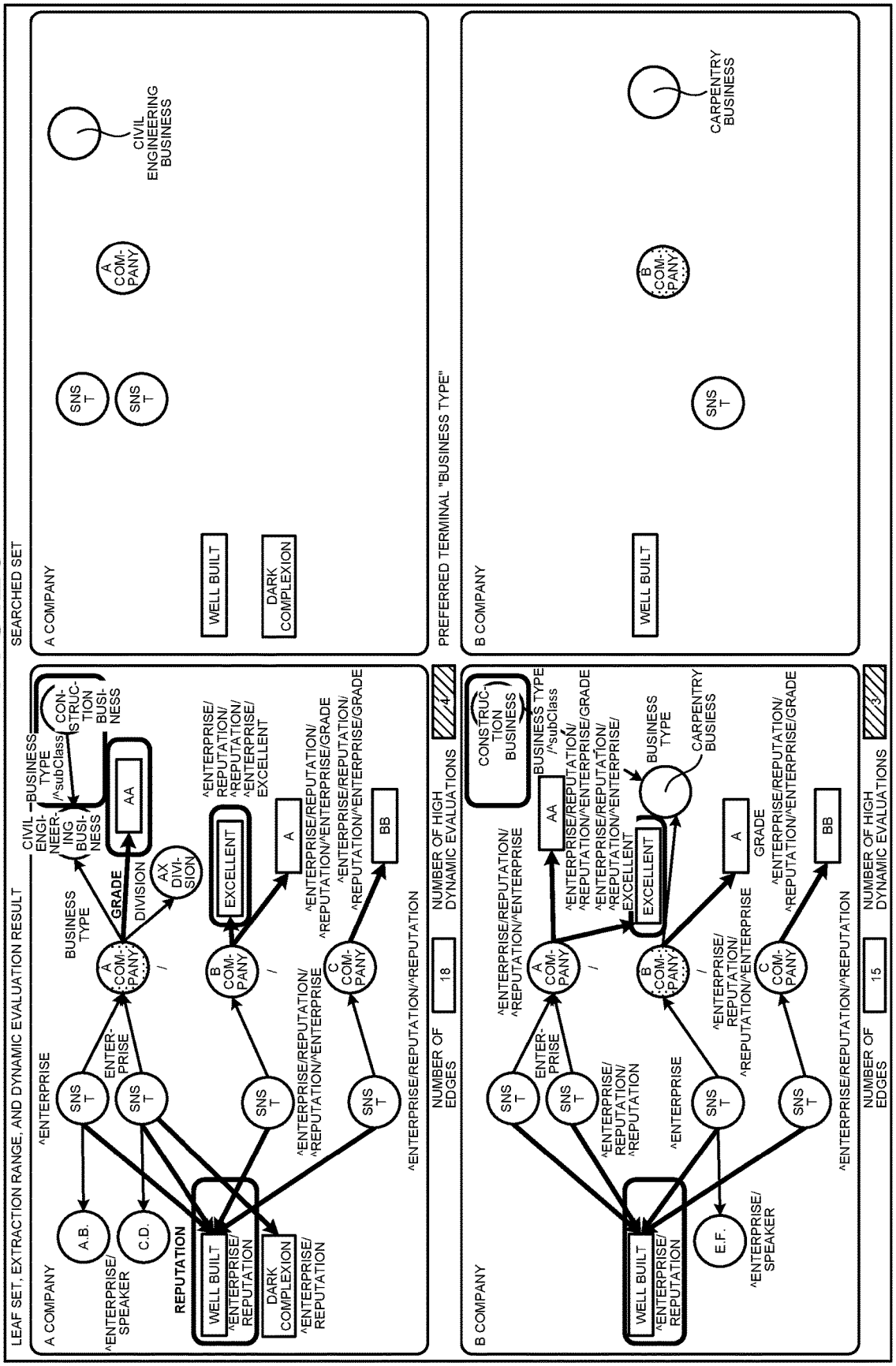
FIG. 20 is a diagram illustrating a learning result.

FIG. 20 is a diagram illustrating the learning result. As illustrated in FIG. 20, for the A company, the dynamic evaluation values of "grade=AA," "business type/^ subClass=construction business," "^ enterprise/reputation=well built," and "^ enterprise/reputation/^ reputation/^ enterprise/excellent=excellent," are increased, and for the B company, the dynamic evaluation values of "business type/^ subClass=construction business," "^ enterprise/reputation=well built," and "^ enterprise/reputation/^ reputation/^ enterprise/excellent=excellent" are increased. As a result, the learning data generating unit 21 ends the generation of the learning data since the number of nodes with a high dynamic evaluation value is 7 and larger than the prescribed number 6. Then, the learning data generating unit 21 extracts the nodes and the edges set in the extraction range at this time point, generates the learning data (A company) and the learning data (B company), and stores the learning data (A company) and the learning data (B company) in the learning data DB 15.

Effects

As described above, the learning device 10 can detect a path in which information useful for estimation is included even in a case in which the information useful for estimation is outside a prescribed number of hops. Further, when the set problem is given in order to infer a part in which data is missed from other peripheral information in the huge knowledge base constructed by connecting various data, the learning device 10 can extract an appropriate graph including enough information to solve the given set problem. Further, the learning device 10 can perform a search with limited resources such as a memory of a computer, decide a range of learning data optimal for solving the set problem, and learn a model.

When an optimal range of learning data to be input for learning is searched for, the learning device 10 can search the extraction range in which information increasing the determination accuracy is the learning data while suppressing the graph size.

[b] Second Embodiment

By the way, some conditions and the like described in the specific example of the first embodiment are merely examples and not limited to the first embodiment. In this regard, in the second embodiment, a variation of each process will be described.

Variation Related to Precondition in Search Process

In a specific example, the example in which, when the extraction range is expanded, the leaf node is randomly selected, and all the edges connected to the selected node are extended by one hop, but the present invention is not limited thereto. For example, expansion of one hop may be performed for all the nodes included in the extraction range. In a case in which it is desired to comprehensively search the range of a small number of hops, it is preferable to select randomly, but in a case in which it is desired to minimize the memory usage amount, methods other than the random method are preferable.

Further, the number of hops may be two or more. Particularly, at the initial stage of execution, since the graph is also small, processing several hops together rather than extending the hop one by one can increase the processing speed. Since the graph is bifurcated, usually, if the more the number of hops is, the number of nodes that increases with one hop is increased. For this reason, if the number of hops is increased by two or more in a state where the number of hops is large, a possibility of exceeding resource restriction greatly becomes high, and thus it is preferable to set the number of hops to be expanded to 1 after the middle of execution.

In the specific example, the example in which the learning is started when the total number of edges is equal to or more than 20 (the initial learning reference) as the timing of initial learning has been described, but the present invention is not limited to this example. For example, in a case in which a subsequent search is efficiently performed by performing the dynamic evaluation earlier at a stage at which the extraction range is small, it is possible to set a small value as the initial learning reference. Further, in a case in which an inputtable amount is input to the memory, and the learning is performed at once while anticipating discovery of relevance of a combination with the large extracted range, it is possible to set a large value as the initial learning reference.

In the specific example, the example in which the threshold value is lowered so that learning occurs earlier, and the dynamic evaluation value is output earlier, and thus at the early stage, determination feature quantity evaluation is performed in a state in which only one of the complex conditions is included in the extraction range, and it is not related to the set problem singly has been described. Further, it has been indicated that, when the range of the other is included in the extraction range at a subsequent stage, it is understood that the former dynamic evaluation value is high as a result of the determination feature quantity evaluation, and the two ranges are related in combination.

Variation Related to Priority Extraction Process

In the specific example, the example in which the static evaluation value has a binary value of high or low, and the edge with a high static evaluation value is searched, for example, up to 2 hops from the end of the extraction range has been described. In the specific example, the number of hops of the search is specified to be longer than in the above-described ordinary extension so that the edge and the node with a high static evaluation value are included in the extraction range with priority. Further, the static evaluation value is less accurate than the dynamic evaluation value, but it can be evaluated in advance without performing the learning and the determination feature quantity evaluation, and thus it is useful to be included in the extraction range with priority while there is a memory restriction.

However, the embodiments are not limited to the restriction. For example, it is possible to change the number of hops on the basis of the static evaluation value by employing a plurality of static evaluation values. It is possible to perform a setting arbitrary, for example, when the static evaluation value is very high such as static evaluation value > first threshold value, the search is performed up to 4 hops, and when the static evaluation value is somewhat high such as second threshold value <static evaluation value <first threshold value, the search is performed up to 2 hops.

Variation Related to Scaling Process

In the specific example, the example in which the dynamic evaluation value has a binary value of high or low has been described, but the present invention is not limited to this example. For example, it is possible to change the delay condition on the basis of the dynamic evaluation value by employing a plurality of dynamic evaluation values. Since the dynamic evaluation value is more accurate than the static evaluation value, it is useful to be included in the extraction range with priority with the delay condition while there is a memory restriction.

Variation Related to Preferred Terminal Setting Process

In the specific example, the example in which the number of preferred terminals is 1 has been described, but it is possible to adjust the number of preferred terminals and control balance between the memory usage amount associated with the range associated with the preferred terminal and the memory usage amount of another range.

For example, by reducing the number of preferred terminals, it is possible to relatively increase the memory usage amount in another range and search another range deeply. Further, when there is a high possibility that there is a range with a high dynamic evaluation value in a deep place, there is a high possibility that both the memory usage amount per preferred terminal and the memory usage amount of other terminals are large, and thus a search in which the number of preferred terminals is reduced can also be used. Further, when there is a high possibility that there is a range with a high dynamic evaluation value in a swallow place, even if the number of preferred terminals is increased, an increase in the memory usage amount is not large as compared with the above case, and thus a search in which the number of replacements of the preferred terminals is reduced by increasing the number of preferred terminals, and the number of trials is reduced can also be performed.

Variation Related to Trigger to Change Preferred Terminal

In the specific example, "when the extraction range is narrowed but still exceeds the resource upper limit" is set the trigger to change the preferred terminal, but it is also possible to adjust whether to search every corner or to search roughly overall by adjusting a timing to change the preferred terminal.

For example, when the preferred terminal is not changed until all other regions are replaced, it is possible to try all combinations, but the number of trials increases. Conversely, when the preferred terminal is changed before other regions are covered, the number of trials decreases, but the number of combinations which are not tried increases. In the method of the first embodiment, other regions are unable to be covered, but since the search can be performed up to the resource upper limit, the efficient search can be executed. Further, as the change trigger, a case in which it is changed after patterns of all ranges which can be taken by other regions are executed to perform the comprehensive search, a case in which it is changed randomly, a case in which it is changed with a prescribed number of times, or the like can be employed.

Variation Related to Preferred Terminal

In the specific example, the example in which the preferred terminal is set to the local maximum of the searched node has been described, but the present invention is not limited to this example. Here, since the graph is bifurcated, if there is a preferred terminal at the root, all nodes before it become the non-deletion target, and the range of the preferred terminal can be widened. As the preferred terminal is stretched, the range of the preferred terminal is narrowed, and the range of the preferred terminal can be minimized by setting it to the local maximum. The size of the range of the preferred terminal has influence on the memory usage amount which can be used by another range and influence on how deeply it can be searched.

In the specific example, since the deletion of the node is targeted to the searched node, the preferred terminal is also set as the searched node. In a case in which a node which is not searched yet is set as a target, the node is not selected as the deletion target even if the node is set as the preferred terminal, and thus the effect is limited.

For example, when a prescribed number or more of hops is not set as the preferred terminal as the setting of the preferred terminal, a candidate in which the preferred terminal is selected is specified with the number of bifurcations at a prescribed number of hops, and a prospect of the entire amount to be processed can be anticipated. However, considering that if the range of the preferred terminal is increased, the memory usage amount which can be used by other ranges decreases, and the search is unable to be performed deeply, it is preferable to set a prescribed number of hops.

Variation Related to Deletion Delay Process

In the specific example, the example in which the definition of the delay condition is "path length+maximum path length on preferred terminal side−total evaluation value path length restriction" has been described, but the present invention is not limited to this example. For example, in the definition of the delay condition, basically, it is preferable to cause one with a high static evaluation value or a high dynamic evaluation value to satisfy the delay condition.

In the specific example, it is defined to be deleted easily when the longest path is long, the path of the target node is long, and the static evaluation value or the dynamic evaluation value is low. A sum of the longest path and the path of the target node indicates the lengths of the two paths, and it indicates how much the distance serving as information is far. Since one with the long distance as the information is unlikely to be associated with the set problem complexly, the path with the longest path and the long distance is deleted. When the static evaluation value or the dynamic evaluation value is high, the relevance with the set problem is likely to be high, and thus one with a low static evaluation value or a low dynamic evaluation value is deleted.

As the variation related to the deletion delay process, the determination is made with the distance between the end nodes of the path rather than the sum of the longest path and the distance from the starting point of the target path, and thus it is possible to more accurately measure the distance between 2 nodes and perform the deletion determination in consideration of the relation. Further, the determination with the extended path makes it possible for the extraction range to move in a direction of the extended path and perform the search instead of performing the search centering on the longest path. Further, since the longest path is far from any path, it is more likely to be deleted.

Further, when a correction value by the static evaluation value or the dynamic evaluation result is increased, it is possible to delay the deletion of the node or the edge with high evaluation as compared to the node or edge with lower evaluation. Further, when the correction value is decreased, it is possible to expedite the deletion of the node or the edge with high evaluation as compared with the node or the edge with low evaluation.

Variation Related to Path Length Restriction of Deletion Delay Process

In the specific example, the example in which the path length restriction is reduced by 1 when the extraction range is unable to satisfy resource restriction even if the deletion is performed has been described, but the present invention is not limited to this example. For the path length restriction, in a case in which the restriction of the path length is loose as compared with the resource restriction, the restriction is constantly satisfied, and the restriction is meaningless. In a case in which the restriction is too loose, and resource is unable to be reduced, correction is performed so that the restriction is applied by making the restriction strict. For example, it is possible to reset the path length restriction to reduce the minimum difference in which the delay condition is not satisfied. Accordingly, it is possible to suppress checking the delay condition many times after decreasing it one by one, and thus the process speed is increased.

Variation Related to Resource Restriction

In the specific example, the example in which a total of 35 edges is set as the resource restriction has been described, but the present invention is not limited to this example. For example, since the memory usage amount of the learning device 10 at the time of learning largely depends on the number of edges of the learning graph, it is possible to set the resource restriction in accordance with a memory of a computer to be used.

Variation Related to Reduction of Extraction Range

In the specific example, the example in which the deletion is performed collectively for each node in the local maximum path of the searched set has been described, but the present invention is not limited to this example. This is because, if deletion in a part which is not local maximum is allowed so that the graph is allowed to be discontinued, or the edges connected to the same node are erased or not erased so that deletion in an edge unit is allowed, management of the extraction range becomes very complicated. For this reason, as an example, in the specific example, a method of collectively processing whether or not deletion is performed for each node for the local maximum path is employed.

Further, in the specific example, the example in which, when the edge is deleted, if there is no edge in the opposite side node, the edge is deleted has been described, but the present invention is not limited to this example. This is because, when there are a plurality of paths from the starting point to the node of the deletion target, even if the edge connected to the node which is the ending point of the path to be deleted is deleted, if a second node from the end of the path from the other side is already searched for, the last edge remains. In other words, depending on circumstances, there are cases in which all the edges connected to the node of the deletion target are erased or remain without being erased after the process of deleting the edge. If there is an edge to be connected, but the node is deleted, there occurs a contradiction that there is an edge even though there is no node, and if the node remains even though there is no edge to be connected, an unconnected node such as a small isolated island may occur. In order to avoid such situations, the process of leaving the node in which the edge is not erased but remains and deleting the node in which the edge is deleted is executed.

Variation Related to Search End Condition

In the specific example, the example in which the search of the extraction range ends when there are six or more high evaluation values has been described, but the present invention is not limited to this example. For example, it is possible to perform determination with a test sample different from a sample in which the learning model obtained as a result of learning is used for learning and set a trigger at which a correct answer rate (determination accuracy) is a certain level or more. Further, it is possible to set an arbitrary number of trials regardless of whether the learning model is successful.

[c] Third Embodiment

The embodiment of the present invention has been described above, but the present invention may be implemented in various different forms besides the above-described embodiments. Therefore, different embodiments will be described below.

Neural Network

In the present embodiment, various neural networks such as an RNN and a convolutional neural network (CNN) can be used. In addition to the error back propagation, various known learning methods can be employed. Further, the neural network has a multistage configuration including, for example, an input layer, an intermediate layer (hidden layer), and an output layer, and each layer has a structure in which a plurality of nodes are connected by an edge. Each layer has a function called an "activation function," the edge has a "weight," and a value of each node is calculated from a value of a node of a previous layer, a value of a weight of a connected edge, and an activation function of a layer. As for the calculation method, various known methods can be employed.

System

A processing procedure, a control procedure, a specific name, information including various data or parameters described in the documents or the drawings described above can be arbitrarily changed unless otherwise specified.

Further, the constituent elements of each device illustrated in the drawings are functionally conceptual, and do not necessarily have to be physically configured as illustrated. In other words, a specific form of distribution or integration of each device is not limited to that illustrated in the drawing. In other words, all or a part thereof can be constituted by functionally or physically distribution or integration in arbitrary units depending on various kinds of load or usage situations. Further, all or arbitrary parts of each processing function performed in each device can be implemented by a CPU and a program analyzed and executed by the CPU or can be implemented as hardware by a wired logic.

Hardware Configuration

Figure 21:
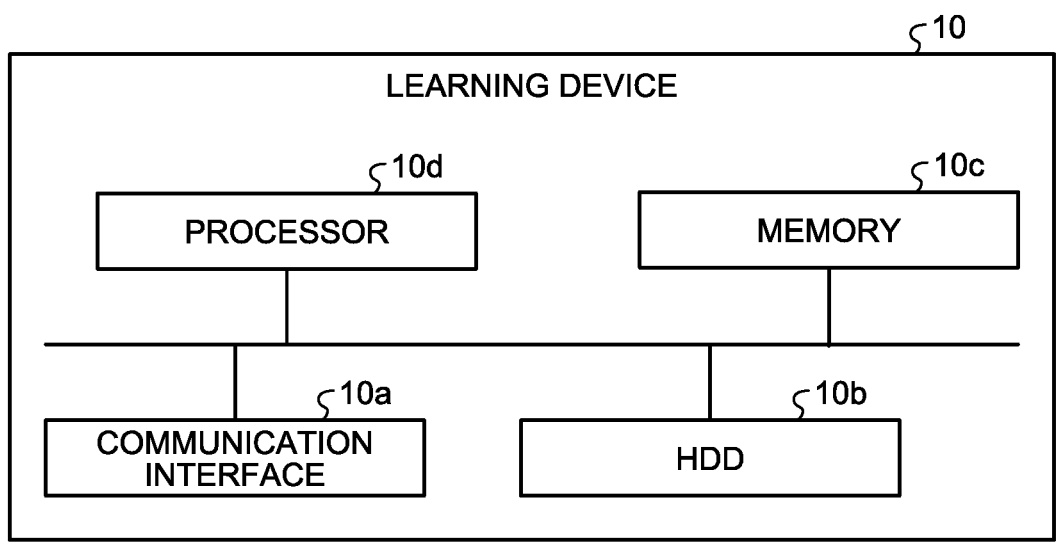
FIG. 21 is a diagram illustrating a hardware configuration example.
Figure 22:
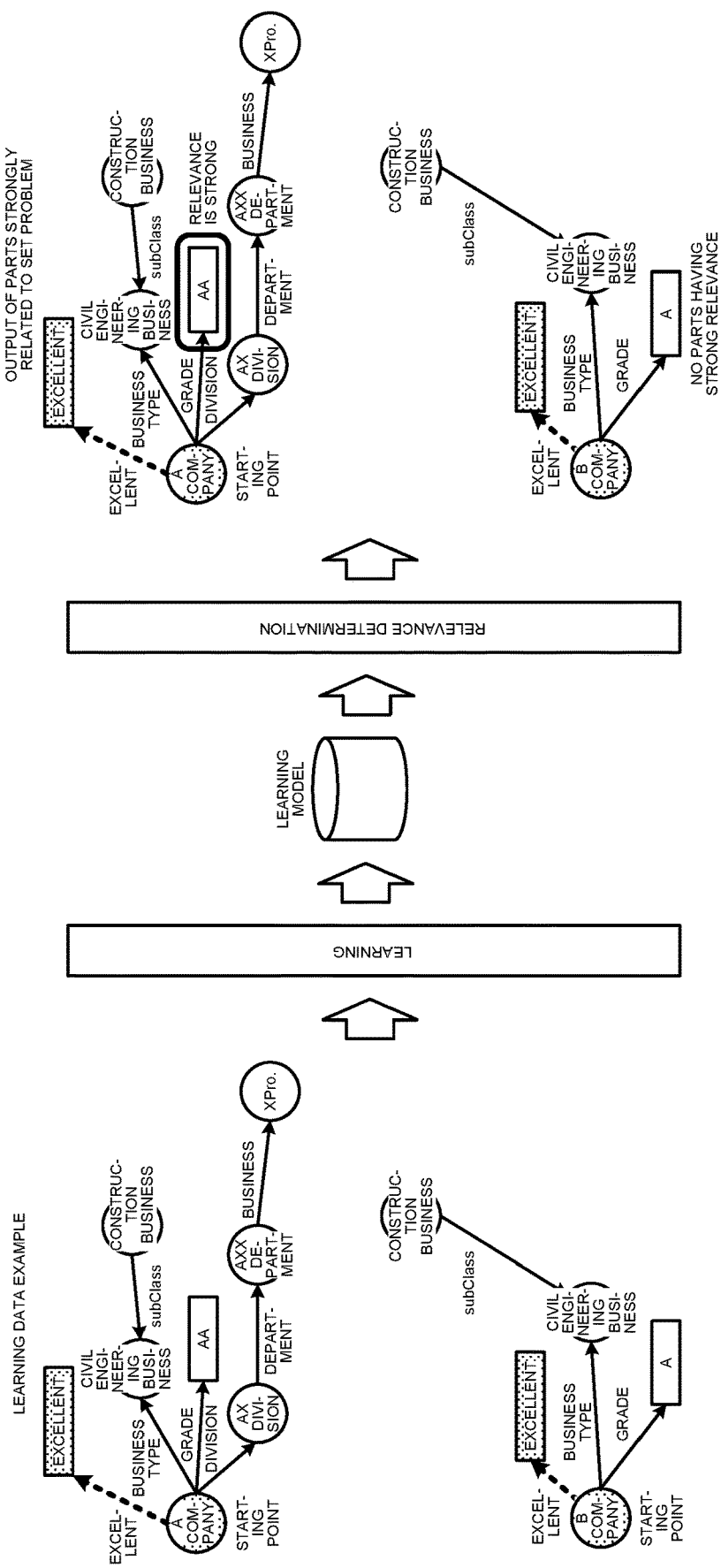
FIG. 22 is a diagram for describing learning of a graph structure.

FIG. 21 is a diagram illustrating a hardware configuration example. As illustrated in FIG. 21, the learning device 10 includes a communication interface 10a, a hard disk drive (HDD) 10b, a memory 10c, and a processor 10d.

The communication interface 10a is, for example, a network interface card that controls communication of other devices or the like. The HDD 10b is an example of a storage device that stores a program, data, and the like.

Examples of the memory 10c include a random access memory (RAM) such as a synchronous dynamic random access memory (SDRAM), a read only memory (ROM), and a flash memory. Examples of the processor 10d include a central processing unit (CPU), a digital signal processor (DSP), a field programmable gate array (FPGA), a programmable logic device (PLD), and the like.

Further, the learning device 10 operates as an information processing device that executes a learning method by reading and executing the program. In other words, the learning device 10 executes a program that performs functions similar to those of the learning data generating unit 21, the learning unit 22, and the determining unit 23. As a result, the learning device 10 can execute a process that performs functions similar to those of the learning data generating unit 21, the learning unit 22, and the determining unit 23. The program described in this other embodiment is not limited to being executed by the learning device 10. For example, the present invention can be similarly applied to a case in which another computer or another server executes a program, or in a case in which they execute a program in cooperation with each other.

According to the embodiments, it is possible to decide the range of the learning data suitable for problem setting from a huge knowledge base.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A search method comprising:
   extracting a search range from a graph in which a plurality of nodes are connected by a plurality of edges wherein in the search range a start node, and nodes and edges that are directly or indirectly connected to the start node are included, on the basis of a set problem and relevance among attributes of nodes and edges included in the graph, using a processor;
   assigning, for each of the nodes and the edges included in the search range, a first evaluation value on the basis of the relevance, and a second evaluation value, wherein the extracting includes extracting the search range including a node and an edge the first evaluation value of which is equal to or larger than a first threshold value, the node and the edge being positioned within a predetermined range from the start node, using the processor;
   generating and updating, for extracted search range, the second evaluation value of each of nodes and the edges included in the search range on the basis of a learning result obtained by inputting the search range to a learning model of the set problem, using the processor; and
   performing a search where a range of the search range is updated on the basis of the second evaluation value of each of the nodes and the edges included in the search range, the relevance and the set problem, using the processor.

2. The search method according to claim 1, wherein,
   the performing includes repeating the search predetermined times in the search the range of the search range being updated using the first evaluation value of nodes and edges included therein and the generated or updated second evaluation value of the nodes and the edges, using the processor.

3. The search method according to claim 2, further comprising:
   constructing a learned model using the search range on which the search is performed, using the processor; and
   extracting a target search range corresponding to the search range, from a graph of a determination target, inputting the target search range to the learned model, and obtaining a determination result, using the processor.

4. The search method according to claim 1, wherein,
   the extracting includes extracting the search range by excluding therefrom a node and an edge that are positioned at a first terminal of the search range and the second evaluation value of which is less than a second threshold value.

5. The search method according to claim 4, further comprising:
   suspend the excluding of the node or the edge that are positioned at the first terminal, using the processor, wherein
   the performing includes performing a learning by the learning model for a node or an edge at a second terminal in a direction different from the first terminal to update the second evaluation value, using the processor.

6. The search method according to claim 5, further comprising:
   calculating, for the search range, a total evaluation value based on the first evaluation value and the second evaluation value for the node or the edge at the second terminal in the different direction, using the processor;
   determining whether or not the total evaluation value satisfies a predetermined condition each time the learning by the learning model is performed, using the processor; and
   excluding the node or the edge at the second terminal in the different direction from the search range in a case in which the total evaluation value does not satisfy the predetermined condition, using the processor.

7. The search method according to claim 1, wherein,
   the extracting includes extracting the search range by including therein a node and an edge which were not positioned in the search range and positioned within a predetermined range from a node at a terminal of the search range, the first evaluation value of the node and the edge being equal to or larger than the first threshold value among.

8. A non-transitory computer-readable recording medium having stored therein a program that causes a computer to execute processing comprising:
- extracting a search range from a graph in which a plurality of nodes are connected by a plurality of edges wherein in the search range a start node, and nodes and edges that are directly or indirectly connected to the start node are included, on the basis of a set problem and relevance among attributes of nodes and edges included in the graph;
- assigning, for each of the nodes and the edges included in the search range, a first evaluation value on the basis of the relevance, and a second evaluation value, wherein the extracting includes extracting the search range including a node and an edge the first evaluation value of which is equal to or lamer than a first threshold value, the node and the edge being positioned within a predetermined range from the start node;
- generating and updating, for the extracted search range, the second evaluation value of each of the nodes and the edges included in the search range on the basis of a learning result obtained by inputting the search range to a learning model of the set problem; and
- performing a search where a range of the search range is updated on the basis of the second evaluation value of each of the nodes and the edges included in the search range, the relevance and the set problem.

9. A search device comprising:
a processor configured to:
- extract a search range that is a part of a graph in which a plurality of nodes are connected by a plurality of edges, wherein in the search range a start node and nodes and edges that are directly or indirectly connected to the start node are included, on the basis of a set problem and relevance among attributes of nodes and edges included in the graph;
- assign, for each of the nodes and the edges included in the search range, a first evaluation value on the basis of the relevance, and a second evaluation value, wherein the extracting includes extracting the search range including a node and an edge the first evaluation value of which is equal to or larger than a first threshold value, the node and the edge being positioned within a predetermined range from the start node;
- generate and update, for the extracted search range, the second evaluation value of each of the nodes and the edges included in the search range on the basis of a learning result obtained by inputting the search range to a learning model of the set problem; and
- perform a search where a range of the search range is updated on the basis of the second evaluation value of each of the nodes and the edges included in the search range, the relevance and the set problem.

* * * * *